(12) United States Patent
O et al.

(10) Patent No.: US 11,295,805 B2
(45) Date of Patent: Apr. 5, 2022

(54) MEMORY MODULES AND STACKED MEMORY DEVICES

(71) Applicant: SAMSUNG ELECTRONICS CO., LTD., Suwon-si (KR)

(72) Inventors: Seongil O, Suwon-si (KR); Jongpil Son, Seongnam-si (KR); Sanghyuk Kwon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/095,008

(22) Filed: Nov. 11, 2020

(65) Prior Publication Data

US 2021/0327489 A1    Oct. 21, 2021

(30) Foreign Application Priority Data

Apr. 20, 2020  (KR) .................. 10-2020-0047233

(51) Int. Cl.
| | |
|---|---|
| G11C 11/40 | (2006.01) |
| G11C 11/4078 | (2006.01) |
| G11C 11/408 | (2006.01) |
| G06F 21/75 | (2013.01) |
| H01L 25/065 | (2006.01) |

(52) U.S. Cl.
CPC .......... *G11C 11/4078* (2013.01); *G06F 21/75* (2013.01); *G11C 11/4087* (2013.01); *H01L 25/0657* (2013.01); *H01L 2225/06541* (2013.01)

(58) Field of Classification Search
None
See application file for complete search history.

(56) References Cited

U.S. PATENT DOCUMENTS

| | | | |
|---|---|---|---|
| 6,223,208 B1* | 4/2001 | Kiefer | ................... G06F 9/3009 |
| | | | 712/E9.032 |
| 6,381,669 B1 | 4/2002 | Chudnovsky et al. | |
| 9,430,406 B2 | 8/2016 | Van Der Sluis et al. | |
| 9,824,754 B2 | 11/2017 | Mandava et al. | |
| 10,534,554 B2 | 1/2020 | Tran et al. | |
| 2018/0150389 A1 | 5/2018 | Bhargava et al. | |
| 2019/0079878 A1 | 3/2019 | Chen et al. | |
| 2019/0215168 A1 | 7/2019 | Wu et al. | |
| 2019/0324725 A1 | 10/2019 | Wang | |

(Continued)

FOREIGN PATENT DOCUMENTS

KR    10-2018-0059217 A    6/2018

*Primary Examiner* — Tan T. Nguyen
(74) *Attorney, Agent, or Firm* — Sughrue Mion, PLLC

(57) ABSTRACT

A memory module includes semiconductor memory devices mounted on a circuit board and a control device mounted on the circuit board. Each semiconductor memory device includes a memory cell array to store data. The control device receives a command and an access address from an external device and provides the command and the access address to the semiconductor memory devices. Each semiconductor memory device performs an address swapping operation to randomly swap a portion of bits of the access address to generate a swapped address in response to a power-up signal or a reset signal, and enables a respective target word-line from among word-lines in the memory cell array such that two or more of the semiconductor memory devices enable different target word-lines in response to the access address.

20 Claims, 23 Drawing Sheets

(56) References Cited

U.S. PATENT DOCUMENTS

| | | |
|---|---|---|
| 2019/0333573 A1 | 10/2019 | Shin et al. |
| 2019/0384938 A1 | 12/2019 | Gu et al. |
| 2020/0241794 A1* | 7/2020 | Yeo .................... G06F 12/0246 |
| 2021/0327489 A1* | 10/2021 | O ........................ G11C 11/4087 |

* cited by examiner

| RSS1,RSS2 | 00 | 01 | 10 | 11 |
|---|---|---|---|---|
| RA0 | SRA0 | SRA1 | SRA2 | SRA3 |
| RA1 | SRA1 | SRA2 | SRA3 | SRA0 |
| RA2 | SRA2 | SRA3 | SRA0 | SRA1 |
| RA3 | SRA3 | SRA0 | SRA1 | SRA2 |

MEMORY MODULES AND STACKED MEMORY DEVICES

CROSS-REFERENCE TO RELATED APPLICATION

This application claims the priority from Korean Patent Application No. 10-2020-0047233 filed on Apr. 20, 2020 in the Korean Intellectual Property Office in the Korean Intellectual Property Office, the disclosure of which is incorporated by reference herein in its entirety.

TECHNICAL FIELD

Exemplary embodiments relate to memory devices, and more particularly, to memory modules and stacked memory devices.

DISCUSSION OF RELATED ART

Among memory devices, a dynamic random access memory (DRAM) device may store data by storing charges to a capacitor of a memory cell. Since the charges in the capacitor are leaked over time, the DRAM device may refresh the memory cell. A memory controller may access an address of the DRAM device randomly, and in particular, may access a particular address frequently or intensively. Because a dynamic random access memory (DRAM), which is a kind of volatile memory device, has a high access speed, the DRAM is widely used as a working memory, a buffer memory, a main memory, or the like of a computing system. For high-capacity, a plurality of DRAMs may be provided in the form of a memory module.

SUMMARY

It is an aspect to provide a memory module capable of distributing disturbance caused by an intensively accessed address.

It is another aspect to provide a stacked memory device capable of distributing disturbance caused by an intensively accessed address.

According to an aspect of an exemplary embodiment, there is provided a memory module includes a plurality of semiconductor memory devices mounted on a circuit board and a control device mounted on the circuit board. Each of the plurality of semiconductor memory devices includes a memory cell array to store data. The control device receives a command and an access address from an external device and provides the command and the access address to the plurality of semiconductor memory devices. Each of the plurality of semiconductor memory devices performs an address swapping operation to randomly swap a portion of bits of the access address to generate a swapped address in response to a power-up signal or a reset signal, and enables a respective target word-line among from among a plurality of word-lines in the memory cell array of the semiconductor memory device such that at least two of the plurality of semiconductor memory devices enable different target word-lines in response to the access address.

According to another aspect of an exemplary embodiment, there is provided a memory module includes a plurality of semiconductor memory devices mounted on a circuit board and a control device mounted on the circuit board. Each of the plurality of semiconductor memory devices including a memory cell array to store data. The control device receives a command and an access address from an external device, performs an address swapping operation to randomly swap a portion of bits of the access address to generate swapped addresses in response to a power-up signal or a reset signal and provides the command and the swapped addresses to the plurality of semiconductor memory devices. The plurality of semiconductor memory devices enable respective target word-lines from among a plurality of word-lines in the memory cell arrays such that at least two of the plurality of semiconductor memory devices enable different target word-lines with respect to the access address.

According to yet another aspect of an exemplary embodiment, there is provided a stacked memory device includes a buffer die, a plurality of memory dies stacked on the buffer die, and a plurality of through silicon vias (TSVs) extending through the plurality of memory dies to connect to the buffer die. The buffer die receives a command and an access address from an external device. The plurality of memory dies includes a memory cell array to store data. Each of the plurality of memory dies receives the access address through the TSVs, performs an address swapping operation to randomly swap a portion of bits of the access address to generate a swapped address in response to a power-up signal or a reset signal and enables a respective target word-line from among a plurality of word-lines in the memory cell array such that at least two of the plurality of memory dies enable different target word-lines in response to the access address.

BRIEF DESCRIPTION OF THE DRAWINGS

The above and other aspects will be more clearly understood by describing in detail exemplary embodiments thereof with reference to the accompanying drawings, in which:

FIG. 7 is an example of a physically unclonable function (PUF) in the address swapping circuit of FIG. 6 according to an exemplary embodiment;

DETAILED DESCRIPTION

Figure 1:
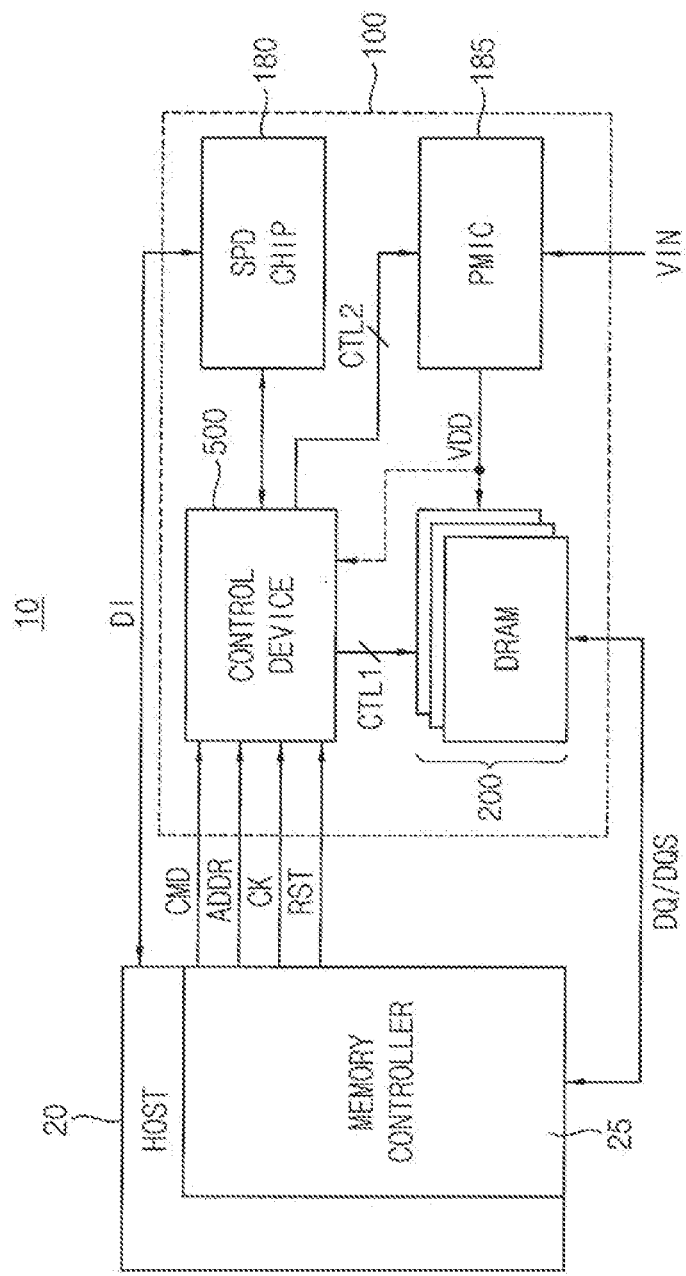
FIG. 1 is a block diagram illustrating a memory system according to various exemplary embodiments.

Exemplary embodiments provide a memory module capable of transmitting address signals symmetrically.

Exemplary embodiments also provide a method of operating the memory module capable of transmitting address signals symmetrically.

According to various exemplary embodiments, a memory module includes a plurality of semiconductor memory devices and a control device. The semiconductor memory devices or the control device may generate swapped row addresses based on a row address in an access address. A row decoder in each of the semiconductor memory devices enables a different target word-line in response to the swapped row address such that at least two of the semiconductor memory devices enable different target word-lines with respect to the access address. Therefore, the semiconductor memory devices may distribute victim word-lines disturbed by intensively-accessed address, and thus decrease a probability of a fault due to hacking.

Various exemplary embodiments will be described more fully hereinafter with reference to the accompanying drawings. Like reference numerals may refer to like elements throughout this application.

FIG. 1 is a block diagram illustrating a memory system according to various exemplary embodiments;

Referring to FIG. 1, a memory system 10 includes a host 20 and a memory module 100. The host 20 may include a memory controller 25.

The memory module 100 may include a control device 500, a plurality of semiconductor memory devices (DRAM) 200, a serial presence detect (SPD) chip 180, a power management integrated circuit (PMIC) 185. In some exemplary embodiments, the control device 500 may be a registered clock driver (RCD).

The control device 500 may control the semiconductor memory devices 200 and the PMIC 185 under control of the memory controller 25. For example, the control device 500 may receive an address ADDR, a command CMD, a reset signal RST and a clock signal CK from the memory controller 25. In response to received signals, the control device 500 may control the semiconductor memory devices 200 through a first control signal CTL1 and may control the PMIC 185 through a second control signal CTL2.

In response to received signals, the control device 500 may control the semiconductor memory devices 200 such that data received through a data signal DQ and a data strobe signal DQS is written in the semiconductor memory devices 200 or such that data stored in the semiconductor memory devices 200 is outputted through the data signal DQ and the data strobe signal DQS.

For example, the control device 500 may transmit the address ADDR, the command CMD, the reset signal RST and the clock signal CK from the memory controller 25 to the semiconductor memory devices 200 as the first control signal CTL1.

The semiconductor memory devices 200 may store data received through the data signal DQ and the data strobe signal DQS under control of the control device 500. Alternatively, the semiconductor memory devices 200 may output the written data through the data signal DQ and the data strobe signal DQS under control of the control device 500.

For example, the semiconductor memory devices 200 may include a volatile memory device such as a dynamic random-access memory (DRAM), a static RAM (SRAM), or a synchronous DRAM (SDRAM). For example, the semiconductor memory devices 200 may be DRAM-based volatile memory devices.

The SPD chip 180 may be a programmable read only memory (e.g., EEPROM). The SPD chip 180 may include initial information or device information DI of the memory module 100. In various exemplary embodiments, the SPD chip 180 may include the initial information or the device information DI such as a module form, a module configuration, a storage capacity, a module type, an execution environment, or the like of the memory module 100.

When the memory system 10 including the memory module 100 is booted up, the host 20 may read the device information DI from the SPD chip 180 and may recognize the memory module 100 based on the device information DI. The host 20 may control the memory module 100 based on the device information DI from the SPD chip 180. For example, the host 20 may recognize a type of the semiconductor memory devices 200 included in the memory module 100 based on the device information DI from the SPD chip 180.

In various exemplary embodiments, the SPD chip 180 may communicate with the host 20 through a serial bus. For example, the host 20 may exchange a signal with the SPD chip 180 through the serial bus. The SPD chip 180 may also communicate with the control device 500 through the serial bus. The serial bus may include at least one of 2-line serial buses such as an inter-integrated circuit (I2C), a system management bus (SMBus), a power management bus (PMBus), an intelligent platform management interface (IPMI), a management component transport protocol (MCTP), or the like.

The PMIC 185 receives an input voltage VIN, generates a power supply voltage VDD based on the input voltage VIN, and provides the power supply voltage VDD to the semiconductor memory devices 200 and/or the control device 500. The semiconductor memory devices 200 operate based on the power supply voltage VDD.

Figure 2:
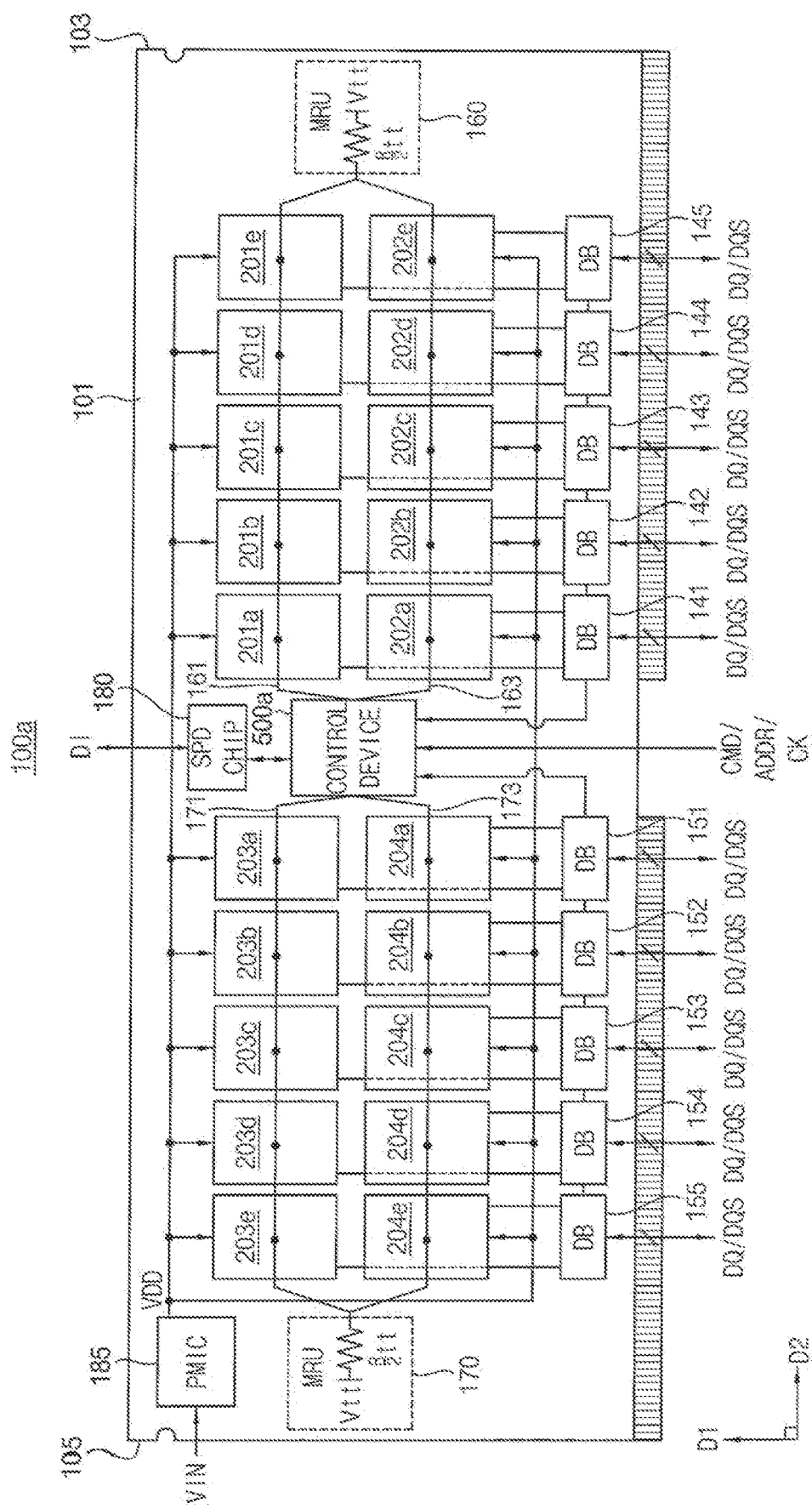
FIG. 2 is a block diagram illustrating a memory module of the memory system of FIG. 1 in detail according to an exemplary embodiment.

FIG. 2 is a block diagram illustrating an example of the memory module of the memory system of FIG. 1 in detail according to an exemplary embodiment.

Referring to FIG. 2, a memory module 100*a* includes a control device 500*a* disposed (or mounted) in a circuit board 101, a plurality of semiconductor memory devices 201*a*~201*e*, 202*a*~202*e*, 203*a*~203*e*, and 204*a*~204*e*, a plurality of data buffers (DB) 141~145 and 151~155, module resistance units (MRU) 160 and 170, the SPD chip 180, and the PMIC 185.

Here, the circuit board 101, which is a printed circuit board, may extend in a second direction D2, perpendicular to a first direction D1, between a first edge portion 103 and a second edge portion 105. The first edge portion 103 and the second edge portion 105 may extend in the first direction D1.

In some exemplary embodiments, the control device 500*a* may be disposed on a center of the circuit board 101. The plurality of semiconductor memory devices 201*a*~201*e*, 202*a*~202*e*, 203*a*~203*e*, and 204*a*~204*e* may be arranged in a plurality of rows between the control device 500*a* and the first edge portion 103 and between the control device 500 and the second edge portion 105.

In this case, the semiconductor memory devices 201*a*~201*e* and 202*a*~202*e* may be arranged along a plurality of rows between the control device 500*a* and the first edge portion 103. The semiconductor memory devices 203*a*~203*e*, and 204*a*~204*e* may be arranged along a plurality of rows between the control device 500*a* and the second edge portion 105. A portion of the semiconductor memory devices 201*a*~201*e* and 202*a*~202*e* may be an error correction code (ECC) memory device. The ECC memory device may perform an ECC encoding operation to generate parity bits about data to be written at memory cells of the plurality of semiconductor memory devices 201*a*~201*e*, 202*a*~202*e*, 203*a*~203*e*, and 204*a*~204*e*, and an ECC decoding operation to correct an error occurring in the data read from the memory cells.

Each of the plurality of semiconductor memory devices 201*a*~201*e*, 202*a*~202*e*, 203*a*~203*e*, and 204*a*~204*e* may be coupled to a corresponding one of the data buffers (DB) 141~145 and 151~155 through a data transmission line for receiving/transmitting the data signal DQ and the data strobe signal DQS.

The control device 500*a* may provide a command/address signal (e.g., CA) to the semiconductor memory devices 201*a*~201*e* through a command/address transmission line 161 and may provide a command/address signal to the semiconductor memory devices 202*a*~202*e* through a command/address transmission line 163. In addition, the control device 500*a* may provide a command/address signal to the semiconductor memory devices 203*a*~203*e* through a command/address transmission line 171 and may provide a command/address signal to the semiconductor memory devices 204*a*~204*e* through a command/address transmission line 173.

The command/address transmission lines 161 and 163 may be connected in common to the module resistance unit (MRU) 160 disposed to be adjacent to the first edge portion 103, and the command/address transmission lines 171 and 173 may be connected in common to the module resistance unit (MRU) 170 disposed to be adjacent to the second edge portion 105. Each of the module resistance units (MRUs) 160 and 170 may include a termination resistor Rtt/2 connected to a termination voltage Vtt. In this case, an arrangement of the module resistance units (MRUs) 160 and 170 may reduce the number of the module resistance units, thus reducing an area where termination resistors are disposed.

In addition, each of the plurality of semiconductor memory devices 201*a*~201*e*, 202*a*~202*e*, 203*a*~203*e*, and 204*a*~204*e* may be a DDR5 SDRAM.

The SPD chip 180 may be disposed to be adjacent to the control device 500*a*, and the PMIC 185 may be disposed between the semiconductor memory device 203*e* and the second edge portion 105. The PMIC 185 may generate the power supply voltage VDD based on the input voltage VIN and may provide the power supply voltage VDD to the semiconductor memory devices 201*a*~201*e*, 202*a*~202*e*, 203*a*~203*e*, and 204*a*~204*e*.

Although FIG. 2 illustrates the PMIC 185 being disposed to be adjacent to the second edge portion 105, exemplary embodiments are not limited thereto, and in some exemplary embodiments, the PMIC 185 may be disposed in a central portion of the circuit board 101 to be adjacent to the control device 500*a*.

Each of the semiconductor memory devices 201*a*~201*e*, 202*a*~202*e*, 203*a*~203*e*, and 204*a*~204*e* may include an address swapping circuit that performs an address swapping operation to randomly swap a portion of bits of the access address ADDR to generate a swapped address in response to a power-up signal or a reset signal and enables a respective target word-line among from a plurality of word-lines in the memory cell array such that at least two of the semiconductor memory devices 201*a*~201*e*, 202*a*~202*e*, 203*a*~203*e*, and 204*a*~204*e* enable different target word-lines in response to the access address.

Each of the semiconductor memory devices 201*a*~201*e*, 202*a*~202*e*, 203*a*~203*e*, and 204*a*~204*e* performs the address swapping operation by the address swapping circuit in each of the semiconductor memory devices 201*a*~201*e*, 202*a*~202*e*, 203*a*~203*e*, and 204*a*~204*e* to output random selection signals with different logic levels in response to the power-up signal and or the reset signal and to swap a portion of bits of the access address ADDR.

Therefore, when the access address ADDR is intensively accessed, that is, when the access address ADDR is more accessed more frequently than a reference number of access times, the semiconductor memory devices 201*a*~201*e*, 202*a*~202*e*, 203*a*~203*e*, and 204*a*~204*e* may distribute (i.e., differentiate) victim word-lines disturbed by the access address ADDR.

Here, the power-up signal may be a signal that is enabled with a logic high level and may be enabled in response to the power supply voltage VDD provided to each of the plurality of semiconductor memory devices 201*a*~201*e*, 202*a*~202*e*, 203*a*~203*e*, and 204*a*~204*e* being equal to or greater than a reference voltage during a power-up sequence in an initializing operation when a power is applied to the memory module 100*a* from the host 20. The reset signal may be a signal which the memory controller 25 applies to the memory module 100*a* during a normal operation of the memory module 100a. The memory module 100a may be reset in response to the reset signal which is enabled with a logic low level.

Figure 3:
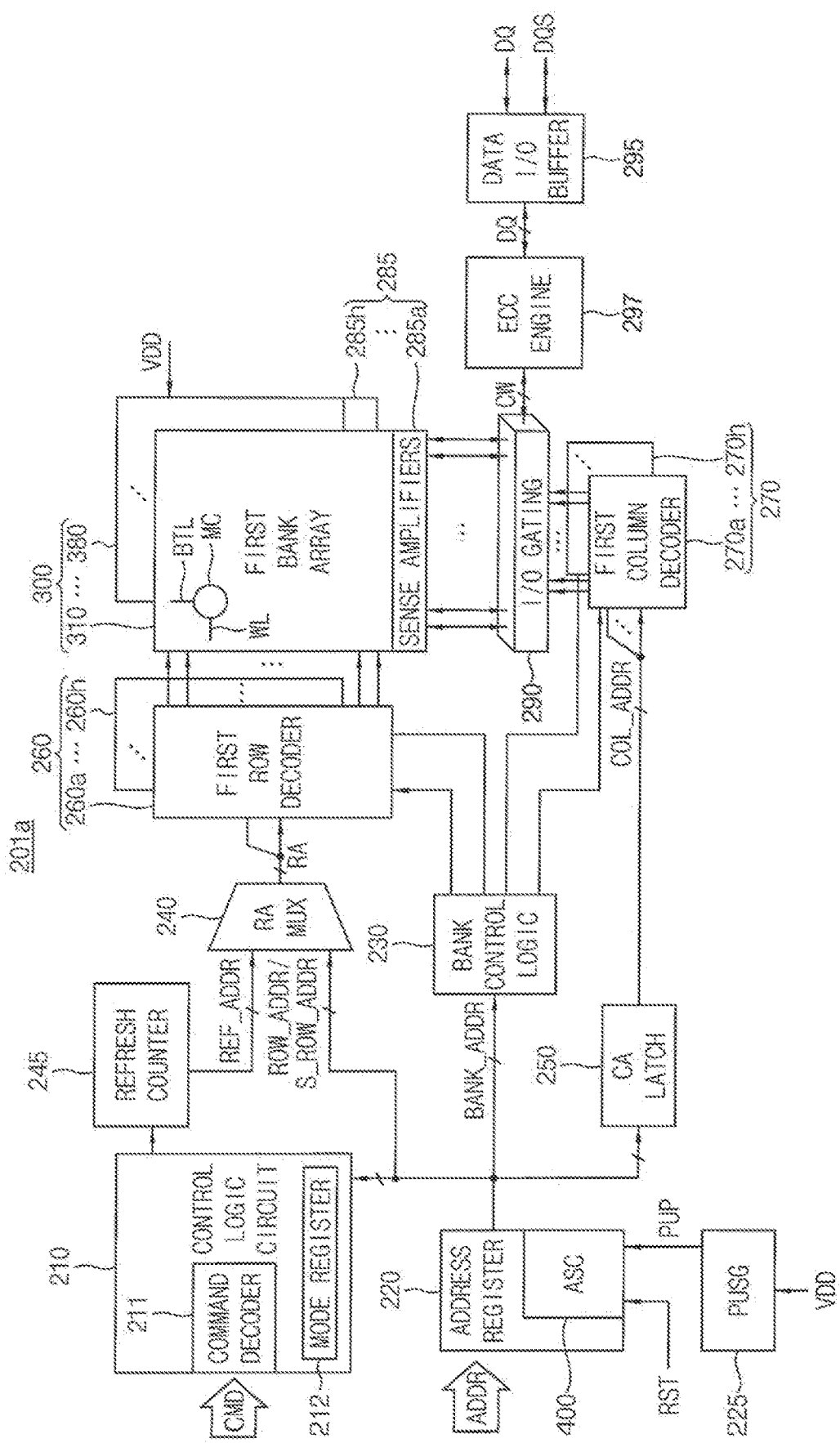
FIG. 3 is a block diagram illustrating one of semiconductor memory devices in the memory module of FIG. 2 according to various exemplary embodiments.

FIG. 3 is a block diagram illustrating one of the semiconductor memory devices in the memory module of FIG. 2 according to various exemplary embodiments.

Referring to FIG. 3, the semiconductor memory device 201a may include a control logic circuit 210, an address register 220, a bank control logic 230, a row address multiplexer (RA MUX) 240, a column address (CA) latch 250, a row decoder 260, a column decoder 270, a memory cell array 300, a sense amplifier unit 285, an input/output gating circuit (I/O GATING) 290, a data input/output (I/O) buffer 295, a power-up signal generator (PUSG) 225, a refresh counter 245 and an ECC engine 297.

The memory cell array 300 may include first through eighth bank arrays 310~380. The memory cell array 300 may operate based on the power supply voltage VDD.

The row decoder 260 may include first through eighth row decoders 260a~260h coupled to the first through eighth bank arrays 310~380, respectively, the column decoder 270 may include first through eighth column decoders 270a~270h coupled to the first through eighth bank arrays 310~380, respectively, and the sense amplifier unit 285 may include first through eighth sense amplifiers 285a~285h coupled to the first through eighth bank arrays 310~380, respectively.

The first through eighth bank arrays 310~380, the first through eighth row decoders 260a~260h, the first through eighth column decoders 270a~270h, and the first through eighth sense amplifiers 285a~285h may form first through eighth banks. Each of the first through eighth bank arrays 310~380 may include a plurality of word-lines WL, a plurality of bit-lines BL, and a plurality of memory cells MC formed at intersections of the word-lines WL and the bit-lines BTL.

Although the semiconductor memory device 201a is illustrated in FIG. 3 as including eight banks, the semiconductor memory device 201a may include any number of banks.

The address register 220 may receive the address ADDR including a bank address BANK_ADDR, a row address ROW_ADDR, and a column address COL_ADDR from the control device 500. The address register 220 may provide the received bank address BANK_ADDR to the bank control logic 230, may provide the received row address ROW_ADDR to the row address multiplexer 240, and may provide the received column address COL_ADDR to the column address latch 250.

The address register 220 may include an address swapping circuit (ASC) 400.

The address swapping circuit 400 may randomly swap a portion of bits of the row address ROW_ADDR to output a swapped row address S_ROW_ADDR in response to a power-up signal PUP or a reset signal RST.

The bank control logic 230 may generate bank control signals in response to the bank address BANK_ADDR. One of the first through eighth row decoders 260a~260h corresponding to the bank address BANK_ADDR may be activated in response to the bank control signals, and one of the first through eighth column decoders 270a~270h corresponding to the bank address BANK_ADDR may be activated in response to the bank control signals.

The row address multiplexer 240 may receive the swapped row address S_ROW_ADDR from the address register 220, and may receive a refresh row address REF_ADDR from the refresh counter 245. The row address multiplexer 240 may selectively output the swapped row address S_ROW_ADDR or the refresh row address REF_ADDR as a row address RA. The row address RA that is output from the row address multiplexer 240 may be applied to the first through eighth bank row decoders 260a~260h.

The activated one of the first through eighth row decoders 260a~260h may decode the row address RA that is output from the row address multiplexer 240, and may activate a word-line WL corresponding to the row address RA. For example, the activated bank row decoder may generate a word-line driving voltage based on the power supply voltage VDD and may apply the word-line driving voltage to the word-line WL corresponding to the row address RA.

The column address latch 250 may receive the column address COL_ADDR from the address register 220, and may temporarily store the received column address COL_ADDR. In various exemplary embodiments, in a burst mode, the column address latch 250 may generate column addresses that increment from the received column address COL_ADDR. The column address latch 250 may apply the temporarily stored or generated column address to the first through eighth bank column decoders 270a~270h.

The activated one of the first through eighth column decoders 270a~270h may decode the column address COL_ADDR that is output from the column address latch 250, and may control the I/O gating circuit 290 to output data corresponding to the column address COL_ADDR.

The I/O gating circuit 290 may include circuitry for gating input/output data. The I/O gating circuit 290 may further include read data latches for storing data that is output from the first through eighth bank arrays 310~380, and write control devices for writing data to the first through eighth bank arrays 310~380.

Data to be read from one of the first through eighth bank arrays 310~380 may be sensed by a sense amplifier coupled to the one bank array from which the data is to be read, and may be stored in the read data latches.

The data stored in the read data latches may be provided to the memory controller 25 via the data I/O buffer 295 after the ECC engine 297 performs an ECC decoding on the data (e.g., a codeword CW). Data to be written in one of the first through eighth bank arrays 310~380 may be provided to the data I/O buffer 295 from the memory controller 25. The ECC engine 297 may perform an ECC encoding on the data provided to the data I/O buffer 295, and the ECC engine 297 may provide the encoded data (e.g., the codeword CW) to the I/O gating circuit 290.

The data I/O buffer 295, in a write operation, provides the data signal DQ to the ECC engine 297. The data I/O buffer 295, in a read operation, receives the data signal DQ from the ECC engine 297 and provides the data signal DQ and the date strobe signal DQS to the memory controller 25.

The power-up signal generator (PUSG) 225 generates the power-up signal PUP which is enabled in response to the power supply voltage VDD from the PMIC 185 being equal to or greater than a reference voltage, The power-up signal generator 225 provides the power-up signal PUP to the address swapping circuit 400.

The power-up signal generator 225 may include a comparator. The comparator compares levels of the power supply voltage VDD and the reference voltage and provides the address swapping circuit 400 with the power-up signal PUP which is enabled in response to the power supply voltage VDD being equal to or greater than the reference voltage.

When the memory module 100a is booted and the PMIC 185 receives the input voltage VIN from the memory controller 25, the PMIC 185 generates various voltages including the power supply voltage VDD based on the input voltage VIN. The semiconductor memory device 201a operates based on the power supply voltage VDD and normally operates when the power supply voltage VDD is equal to or greater than a specific voltage level.

The power-up signal generator 225 may set the specific voltage level at which the semiconductor memory device 201 normally operates as the reference voltage, and provides the address swapping circuit 400 with the power-up signal PUP which is enabled in response to the power supply voltage VDD being equal to or greater than the reference voltage. In response to receiving the power-up signal PUP, the address swapping circuit 400 converts the access address ADDR to the swapped address and provides the swapped address to the row decoder 160.

The control logic circuit 210 may control operations of the semiconductor memory device 201a. For example, the control logic circuit 210 may generate control signals for the memory device 201a to perform the write operation or the read operation. The control logic circuit 210 may include a command decoder 211 that decodes the command CMD received from the memory controller 25 through the control device 500a and a mode register 212 that sets an operation mode of the semiconductor memory device 201a.

For example, the command decoder 211 may generate the control signals corresponding to the command CMD by decoding a write enable signal, a row address strobe signal, a column address strobe signal, a chip select signal, etc.

Figure 4:
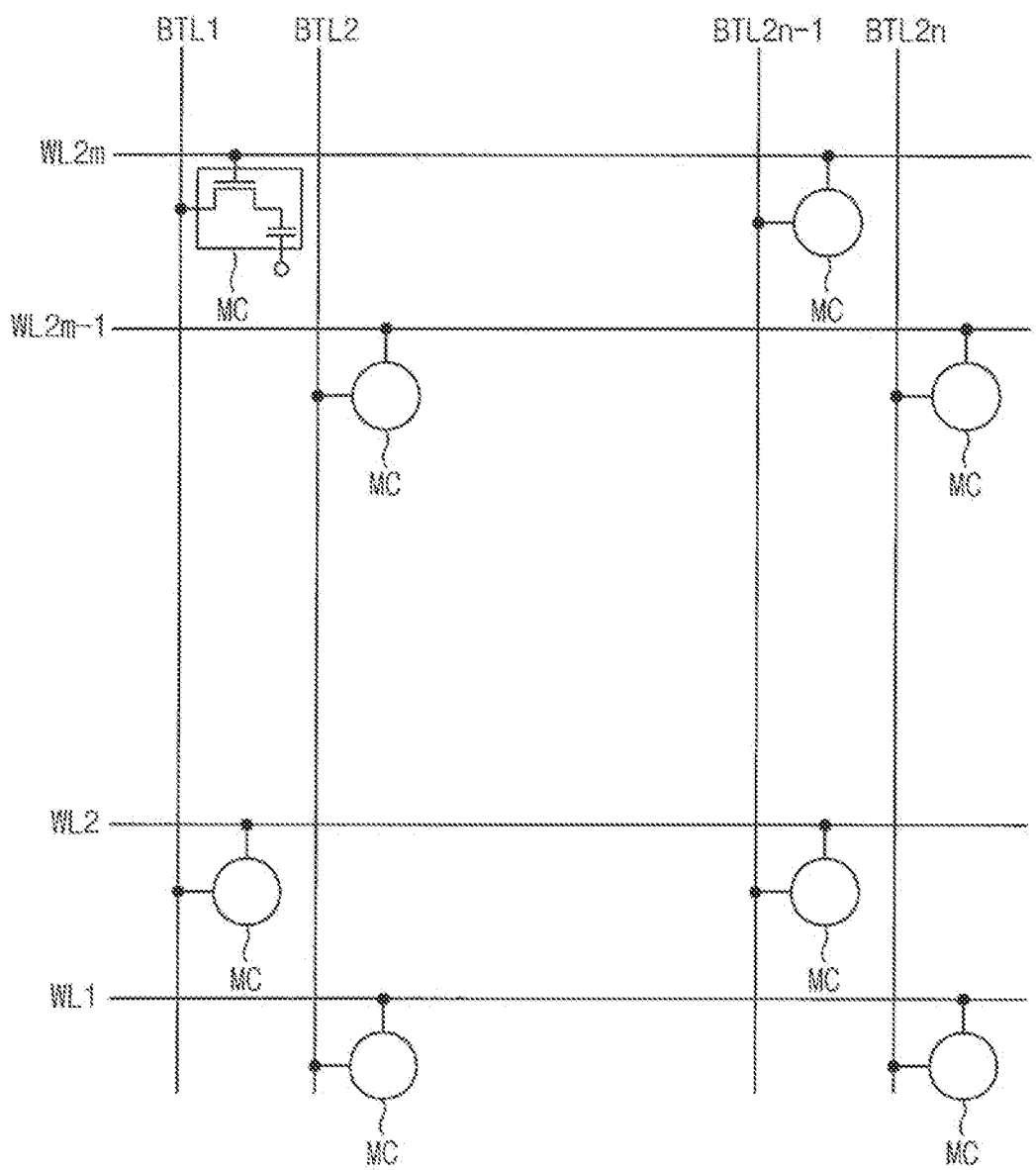
FIG. 4 illustrates a first bank array of the semiconductor memory device of FIG. 3 according to various exemplary embodiments.

FIG. 4 illustrates a first bank array of the semiconductor memory device of FIG. 3 according to various exemplary embodiments.

Referring to FIG. 4, the first bank array 310 includes a plurality of word-lines WL1~WL2m (where m is a natural number greater than two), a plurality of bit-lines BTL1~BTL2n (where n is a natural number greater than two), and a plurality of memory cells MCs disposed near intersections between the word-lines WL1~WL2m and the bit-lines BTL1~BTL2n. In an exemplary embodiment, each of the plurality of memory cells MCs may include a DRAM cell structure. The plurality of word-lines WL1~WL2m to which the plurality of memory cells MCs are connected may be referred to as rows of the first bank array 310 and the plurality of bit-lines BL1~BL3n to which the plurality of memory cells MCs are connected may be referred to as columns of the first bank array 310.

Figure 5:
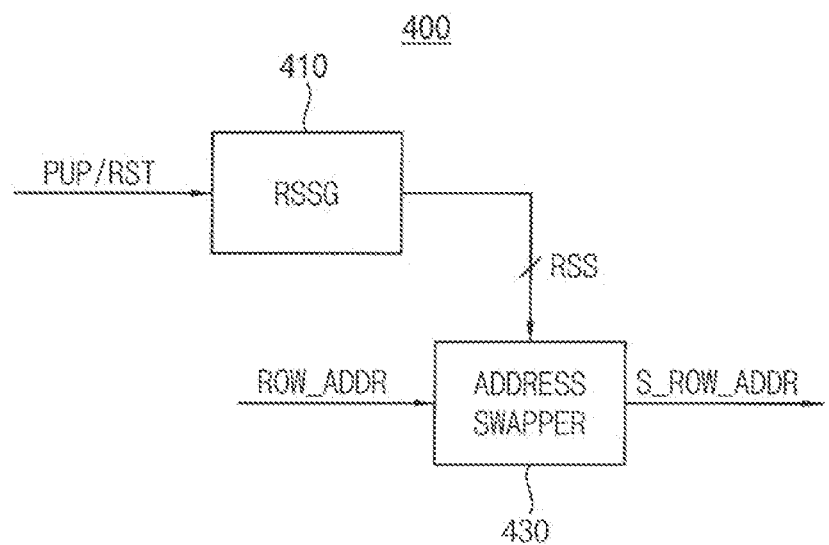
FIG. 5 is a block diagram illustrating an address swapping circuit in the semiconductor memory device of FIG. 3 according to an exemplary embodiment.

FIG. 5 is a block diagram illustrating the address swapping circuit in the semiconductor memory device of FIG. 3 according to an exemplary embodiment.

Referring to FIG. 5, the address swapping circuit (ASC) 400 may include a random selection signal generator (RSSG) 410 and an address swapper 430.

The random selection signal generator 410 may randomly generate random selection signals RSS in response to the power-up signal PUP or the reset signal RST. The address swapper 430 may swap a portion of bits of the row address ROW_ADDR to output the swapped row address S_ROW_ADDR in response to the random selection signals RSS.

The random selection signal generator 410 may include a circuit element such as a physically unclonable function (PUF), a random number generator, an anti-fuse circuit or a fuse circuit, which is triggered by the power-up signal PUP or the reset signal RST to output the random selection signals RSS randomly.

The random selection signal generator in each of the semiconductor memory devices 201a~201e, 202a~202e, 203a~203e, and 204a~204e is triggered by the power-up signal PUP or the reset signal RST and may generate the random selection signals RSS with different logic levels, and the address swapper in each of may convert the row address ROW_ADDR to different swapped row address S_ROW_ADDR designating a different memory cell row in response to the random selection signals RSS with different logic levels.

Figure 6:
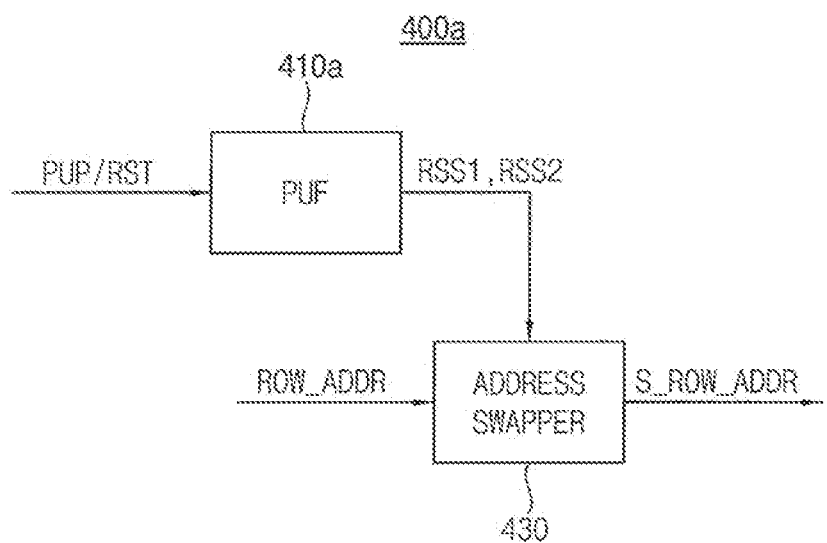
FIG. 6 is a block diagram illustrating an example of the address swapping circuit of FIG. 5 according to an exemplary embodiment.

FIG. 6 is a block diagram illustrating an example of the address swapping circuit of FIG. 5 according to an exemplary embodiment.

Referring to FIG. 6, an address swapping circuit 400a may include a random selection signal generator 410a and the address swapper 430.

The address swapping circuit 400a may include a physically unclonable function (PUF) 410a and the PUF 410a may randomly generate the random selection signals RSS in response to the power-up signal PUP or the reset signal RST. The address swapper 430 may swap a portion of bits of the row address ROW_ADDR to output the swapped row address S_ROW_ADDR in response to the random selection signals RSS.

When the random selection signal generator 410 in FIG. 5 is implemented with the PUF 410a as in FIG. 6, the address swapping circuit 400a may perform the address swapping operation while protecting against hacking from outside the memory system.

FIG. 7 is an example of the physically unclonable function (PUF) in the address swapping circuit of FIG. 6 according to an exemplary embodiment.

In FIG. 7, it is assumed that that the random selection signals RSS include a first random selection signal (bit) RSS1 and a second random selection signal (bit) RSS2 and the PUF 410a may swap a portion of bits RA0, RA1, RA2 and RA3 of the row address ROW_ADDR to output a portion of bits SRA0, SRA1, SRA2 and SRA3 of the swapped row address S_ROW_ADDR.

Referring to FIG. 7, when the first random selection signal RSS1 and the second random selection signal RSS2 correspond to '00', the portion of bits RA0, RA1, RA2 and RA3 of the row address ROW_ADDR may be swapped to a portion of bits SRA0, SRA1, SRA2 and SRA3 of the swapped row address S_ROW_ADDR, respectively. When the first random selection signal RSS1 and the second random selection signal RSS2 correspond to '01', the portion of bits RA0, RA1, RA2 and RA3 of the row address ROW_ADDR may be swapped to a portion of bits SRA1, SRA2, SRA3 and SRA0 of the swapped row address S_ROW_ADDR, respectively.

When the first random selection signal RSS1 and the second random selection signal RSS2 correspond to '10', the portion of bits RA0, RA1, RA2 and RA3 of the row address ROW_ADDR may be swapped to a portion of bits SRA2, SRA3, SRA0 and SRA1 of the swapped row address S_ROW_ADDR, respectively. When the first random selection signal RSS1 and the second random selection signal RSS2 correspond to '11', the portion of bits RA0, RA1, RA2 and RA3 of the row address ROW_ADDR may be swapped to a portion of bits SRA3, SRA0, SRA1 and SRA2 of the swapped row address S_ROW_ADDR, respectively.

Therefore, when the random selection signal generator 410 in FIG. 5 is triggered by the power-up signal PUP or the reset signal RST and determines logic levels of the random selection signals RSS, the address swapper 430 may randomly swap the portion of bits of the row address ROW_ADDR to output the swapped row address S_ROW_ADDR based on the logic levels of the random selection signals RSS, which is randomly determined.

Figure 8:
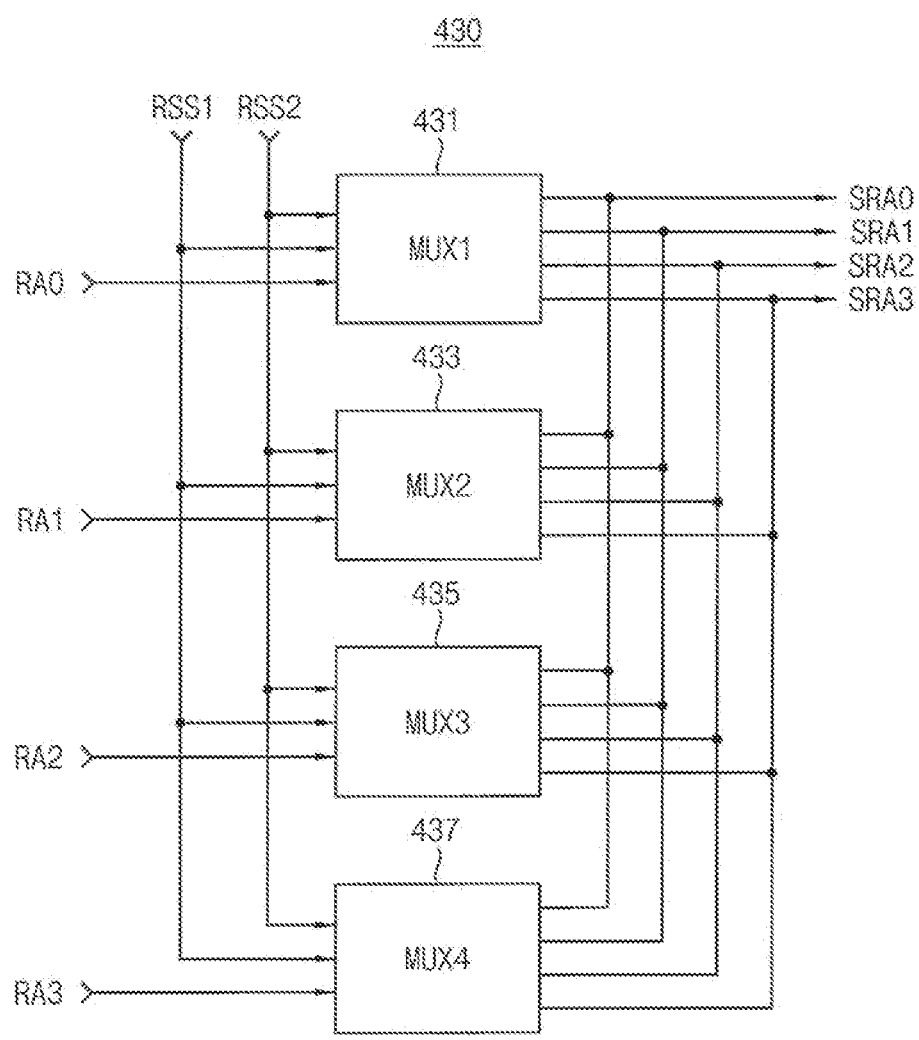
FIG. 8 is a circuit diagram illustrating an address swapper of the address swapping circuit of FIG. 5 according to an exemplary embodiment.

FIG. 8 is a circuit diagram illustrating an address swapper of the address swapping circuit of FIG. 5 according to an exemplary embodiment.

In FIG. 8, it is assumed that that the that the random selection signals RSS include a first random selection signal RSS1 and a second random selection signal RSS2 and address swapper 430 may swap a portion of bits RA0, RA1, RA2 and RA3 of the row address ROW_ADDR to output portion of bits SRA0, SRA1, SRA2 and SRA3 of the swapped row address S_ROW_ADDR in response to the first random selection signal RSS1 and the second random selection signal RSS2.

Referring to FIG. 8, the address swapper 430 may include a plurality of multiplexers 431, 433, 435 and 437.

Each of the multiplexers 431, 433, 435 and 437 receives a corresponding one of the portion of bits RA0, RA1, RA2 and RA3 of the row address ROW_ADDR, and outputs the corresponding one of the portion of bits RA0, RA1, RA2 and RA3 based on combination of the first random selection signal RSS1 and the second random selection signal RSS2 as corresponding one of the portion of bits SRA0, SRA1, SRA2 and SRA3 of the swapped row address S_ROW_ADDR.

As described with reference to FIG. 7, the portion of bits RA0, RA1, RA2 and RA3 of the row address ROW_ADDR may be swapped to one of the portion of bits SRA0, SRA1, SRA2 and SRA3, the portion of bits SRA1, SRA2, SRA3 and SRA0, the portion of bits SRA2, SRA3, SRA0 and SRA1 or the portion of bits SRA3, SRA0, SRA1 and SRA2.

A number of the multiplexers in the address swapper 430 in FIG. 8 may be varied according to a number of bits to be swapped. For swapping p-bit of the row address ROW_ADDR, the address swapper 430 may include 2P multiplexers and the random selection signals RSS include p-bit. Here, p bit is a natural number.

Figure 9:
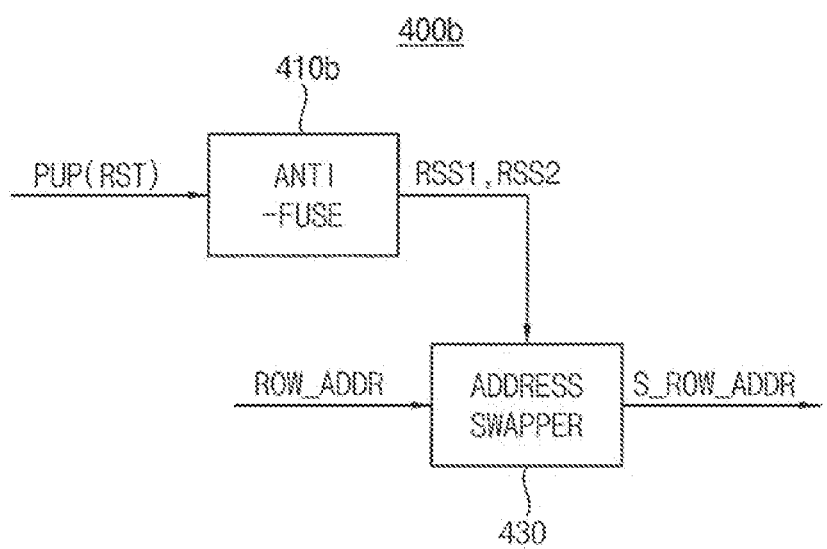
FIG. 9 is a block diagram illustrating another example of the address swapping circuit of FIG. 5 according to an exemplary embodiment.

FIG. 9 is a block diagram illustrating another example of the address swapping circuit of FIG. 5 according to an exemplary embodiment.

Referring to FIG. 9, an address swapping circuit 400b may include an anti-fuse circuit 410b and the address swapper 430.

Logic levels of the first random selection signal RSS1 and the second random selection signal RSS2 may be programmed in the anti-fuse circuit 410b and the anti-fuse circuit 410b may output the first random selection signal RSS1 and the second random selection signal RSS2 to the address swapper 430 in response to the power-up signal PUP or the reset signal RST. The address swapper 430 may swap a portion of bits of the row address ROW_ADDR to output the swapped row address S_ROW_ADDR in response to the random selection signals RSS1 and RSS2.

The logic levels of the first random selection signal RSS1 and the second random selection signal RSS2 may be programmed in the anti-fuse circuit in each of the semiconductor memory devices 201a~201e, 202a~202e, 203a~203e, and 204a~204e in different sequence.

The first random selection signal RSS1 and the second random selection signal RSS2 may be programmed in the anti-fuse circuit in a first semiconductor memory device in a sequence of '00', may be programmed in the anti-fuse circuit in a second semiconductor memory device in a sequence of '01', may be programmed in the anti-fuse circuit in a third semiconductor memory device in a sequence of '10' and may be programmed in the anti-fuse circuit in a fourth semiconductor memory device in a sequence of '11'.

In some exemplary embodiments, a fuse circuit instead of the anti-fuse circuit 410b may employed by the random selection signal generator 410.

Figure 10:
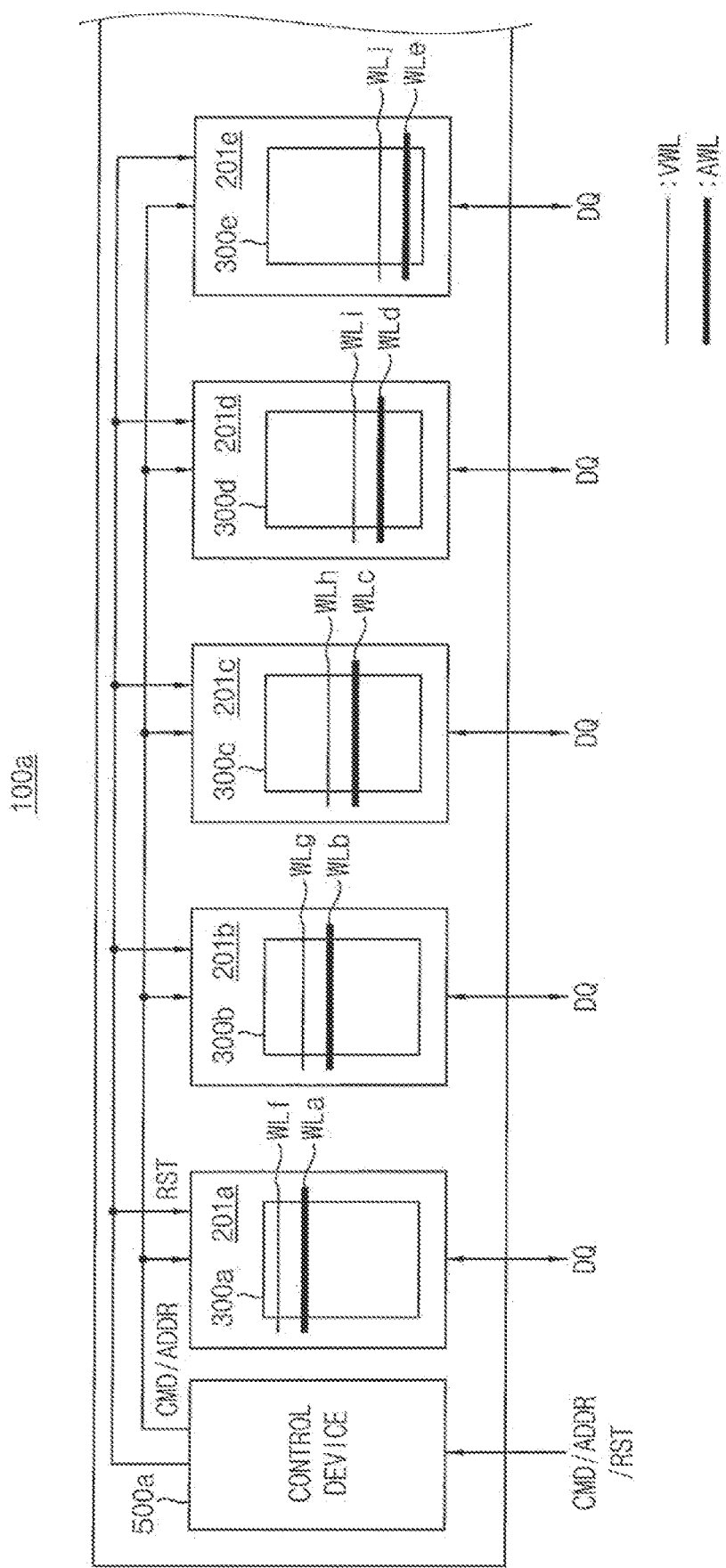
FIG. 10 illustrates an example of an address swapping operation of the memory module of FIG. 2 according to an exemplary embodiment.

FIG. 10 illustrates an example of an address swapping operation of the memory module of FIG. 2 according to an exemplary embodiment.

In FIG. 10, the semiconductor memory devices 201a~201e of the semiconductor memory devices 201a~201e, 202a~202e, 203a~203e, and 204a~204e and the control device 500a are illustrated. It will be understood that the remaining ones of the semiconductor memory devices 201a~201e, 202a~202e, 203a~203e, and 204a~204e operate in a similar manner, and thus description thereof has been omitted for conciseness.

Referring to FIG. 10, the control device 500a receives the command CMD, the access address ADDR and the reset signal RST and relays the command CMD and the access address ADDR to the semiconductor memory devices 201a~201e. In addition, the control device 500a relays the reset signal RST to the semiconductor memory devices 201a~201e.

The semiconductor memory device 201a includes a memory cell array 300a, the semiconductor memory device 201b includes a memory cell array 300b, the semiconductor memory device 201c includes a memory cell array 300c, the semiconductor memory device 201d includes a memory cell array 300d and the semiconductor memory device 201e includes a memory cell array 300e.

An address swapping circuit in the semiconductor memory device 201a converts the row address to a first swapped row address to enable a target word-line WLa of the memory cell array 300a, an address swapping circuit in the semiconductor memory device 201b converts the row address to a second swapped row address to enable a target word-line WLb of the memory cell array 300b, an address swapping circuit in the semiconductor memory device 201c converts the row address to a third swapped row address to enable a target word-line WLc of the memory cell array 300c, an address swapping circuit in the semiconductor memory device 201d converts the row address to a fourth swapped row address to enable a target word-line WLd of the memory cell array 300d and an address swapping circuit in the semiconductor memory device 201e converts the row address to a fifth swapped row address to enable a target word-line WLe of the memory cell array 300e.

Therefore, the semiconductor memory devices 201a~201e enable different target word-lines WLa, WLb, WLc, WLd and WLe, respectively in response to the access address ADDR. In addition, if the access address ADDR is intensively accessed, victim word-lines WLf, WLg, WLh, WLi and WLj disturbed by the target word-lines WLa, WLb, WLc, WLd and WLe, respectively, are different in the semiconductor memory devices 201a~201e. Therefore, the semiconductor memory devices 201a~201e may distribute the victim word-lines WLf, WLg, WLh, WLi and WLj disturbed by the access address ADDR.

In FIG. 10, AWL denotes aggressor word-lines corresponding to the target word-lines WLa, WLb, WLc, WLd and WLe, and VWL denotes the victim word-lines.

Figure 11:
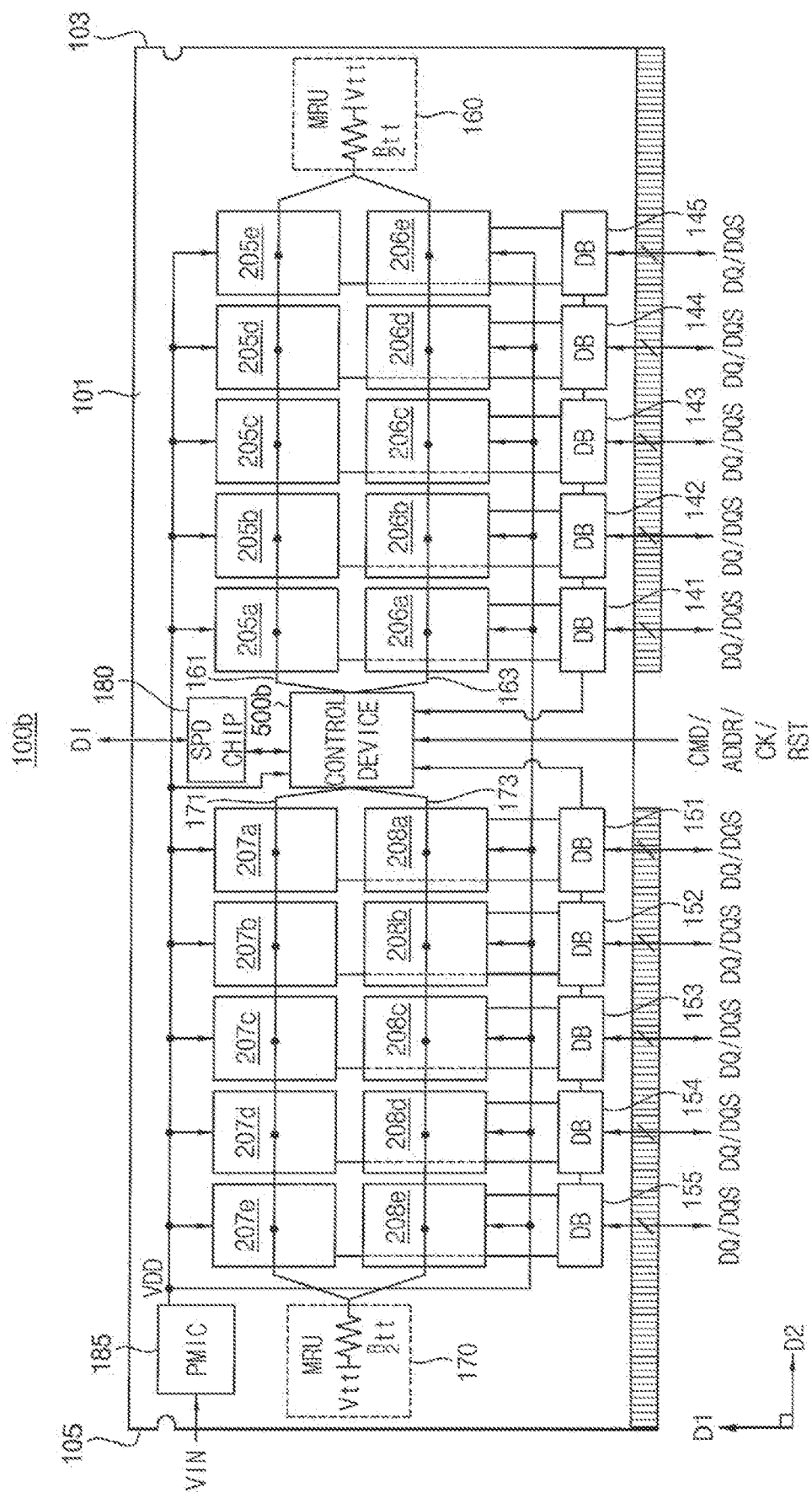
FIG. 11 is a block diagram illustrating another example of memory module of the memory system of FIG. 1 in detail according to an exemplary embodiment.

FIG. 11 is a block diagram illustrating another example of a memory module of the memory system of FIG. 1 in detail according to an exemplary embodiment.

Referring to FIG. 11, a memory module 100b includes a control device 500b disposed (or mounted) in a circuit board 101, a plurality of semiconductor memory devices 205a~205e, 206a~206e, 207a~207e, and 208a~208e, a plurality of data buffers (DB) 141~145 and 151~155, module resistance units (MRUs)160 and 170, the SPD chip 180, and the PMIC 185.

The memory module 100b of FIG. 11 differs from the memory module 100a of FIG. 2 in that the control device 500b performs and address swapping and provides swapped addresses to the semiconductor memory devices 205a~205e, 206a~206e, 207a~207e, and 208a~208e and in that the control device 500b receives the power supply voltage VDD.

The control device 500b receives the command CMD, the access address ADDR, the clock signal CK and the reset signal RST, randomly swaps a portion of bits of the access address ADDR to generate swapped addresses in response to the reset signal RST or a power-up signal to provide the swapped addresses to the semiconductor memory devices 205a~205e, 206a~206e, 207a~207e, and 208a~208e, respectively. The control device 500b may include a plurality of address swapping circuits corresponding to respective ones of the semiconductor memory devices 205a~205e, 206a~206e, 207a~207e, and 208a~208e.

Each of the semiconductor memory devices 205a~205e, 206a~206e, 207a~207e, and 208a~208e receives a corresponding one of the swapped addresses and enables a target word-line corresponding to the respective one of the swapped addresses such that two or more of the semiconductor memory devices 205a~205e, 206a~206e, 207a~207e, and 208a~208e enable different target word-lines with respect to the access address ADDR.

Accordingly, when the access address ADDR is intensively accessed, the semiconductor memory devices 205a~205e, 206a~206e, 207a~207e, and 208a~208e may distribute (i.e., differentiate) victim word-lines disturbed by the access address ADDR.

Figure 12:
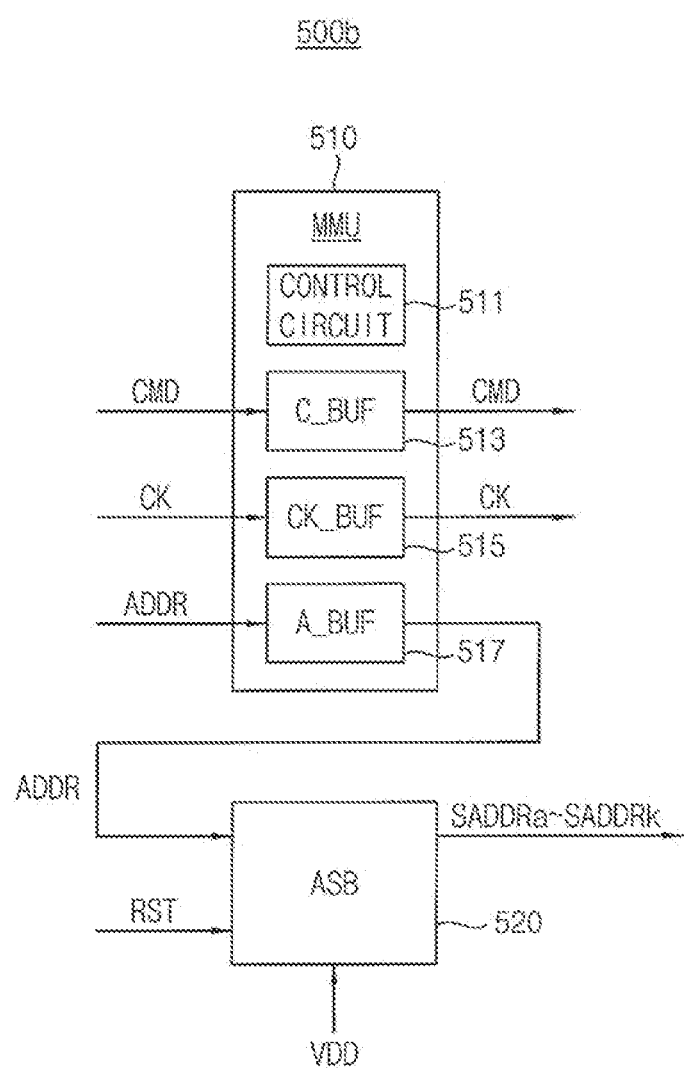
FIG. 12 is a block diagram illustrating an example of a control device in the memory module of FIG. 11 according to an exemplary embodiment.

FIG. 12 is a block diagram illustrating an example of the control device in the memory module of FIG. 11 according to an exemplary embodiment.

Referring to FIG. 12, the control device 500b may include a memory management unit (MMU) 510, an address swapping circuit block (ASB) 520.

The MMU 510 may relay command CMD and the clock signal CK to the semiconductor memory devices 205a~205e, 206a~206e, 207a~207e, and 208a~208e and may provide the access address ADDR to the ASB 520.

The MMU 510 may include a control circuit 511, a command buffer C_BUF 513, a clock buffer CK_BUF and an address buffer A_BUF 517. The control circuit 511 controls the command buffer, the clock buffer and the address buffer 517 to control buffering timing of the command CMD, the clock signal CK and the access address ADDR.

The ASB 520 may randomly swap a portion of bits of the access address ADDR to generate swapped addresses SADDRa~SADDRk in response to the reset signal RST or the power-up signal based on the power supply voltage VDD to provide the swapped addresses SADDRa~SADDRk to the semiconductor memory devices 205a~205e, 206a~206e, 207a~207e, and 208a~208e, respectively.

The control circuit 511 may control a timing of providing the swapped addresses SADDRa~SADDRk and a timing of providing the command CMD and the clock signal CK.

Figure 13:
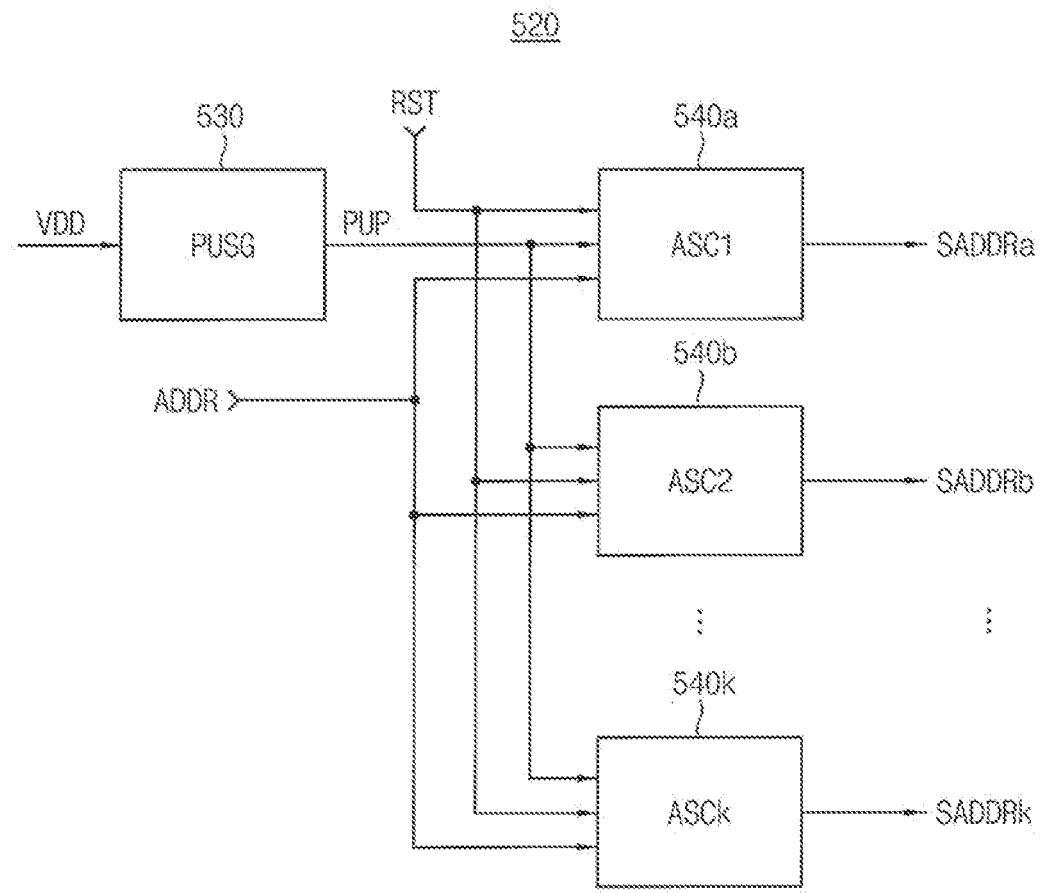
FIG. 13 is a block diagram illustrating an example of the address swapping circuit block (ASB) in the control device of FIG. 12 according to an exemplary embodiment.

FIG. 13 is a block diagram illustrating an example of the address swapping circuit block (ASB) in the control device of FIG. 12 according to an exemplary embodiment.

Referring to FIG. 13, the ASB 520 includes a power-up signal generator PUSG 530 and a plurality of address swapping circuits ASC1~ASCk 540a~540k.

The power-up signal generator 530 generates a power-up signal PUP which is enabled in response to the power supply voltage VDD from the PMIC 185 being equal to or greater than a reference voltage. The power-up signal generator 530 provides the power-up signal PUP to the address swapping circuits 540a~540k.

The address swapping circuits 540a~540k may randomly swap a portion of bits of the access address ADDR to generate the swapped addresses SADDRa~SADDRk in response to the power-up signal PUP or the reset signal RST, and may provide the swapped addresses SADDRa~SADDRk to the semiconductor memory devices 205a~205e, 206a~206e, 207a~207e, and 208a~208e, respectively.

A number of the address swapping circuits 540a~540k may be equal to or less than a number of the semiconductor memory devices 205a~205e, 206a~206e, 207a~207e, and 208a~208e. The control device 500b may control the address swapping circuits 540a~540k to provide the swapped addresses SADDRa~SADDRk to the semiconductor memory devices 205a~205e, 206a~206e, 207a~207e, and 208a~208e, respectively.

Figure 14:
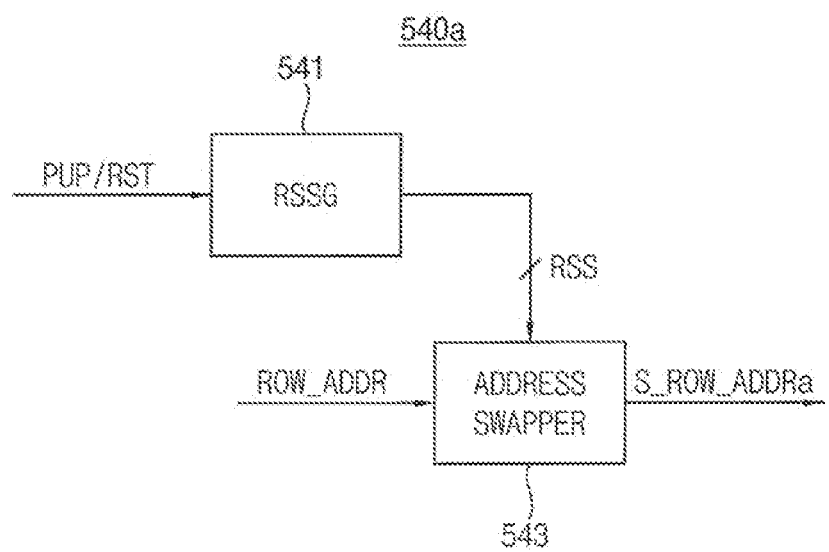
FIG. 14 is a block diagram illustrating one of address swapping circuits of the ASB of FIG. 13 according to an exemplary embodiment.

FIG. 14 is a block diagram illustrating one of the address swapping circuits of the address swapping circuit block of FIG. 13 according to an exemplary embodiment.

FIG. 14 illustrates a configuration of the address swapping circuit 540a by way of illustration, and it will be understood that a configuration of each of the address swapping circuits 540b~540k may be substantially the same as the configuration of the address swapping circuit 540a and thus a repeated description thereof is omitted for conciseness.

Referring to FIG. 14, the address swapping circuit 540a may include a random selection signal generator (RSSG) 541 and an address swapper 543.

The random selection signal generator 541 may randomly generate random selection signals RSS in response to the power-up signal PUP or the reset signal RST. The address swapper 543 may swap a portion of bits of the row address ROW_ADDR to output the swapped row address S_ROW_ADDRa in response to the random selection signals RSS.

The address swapper 543 may include a circuit element such as a physically unclonable function (PUF(, a random number generator, an anti-fuse circuit or a fuse circuit, which is triggered by the power-up signal PUP or the reset signal RST to output the random selection signals RSS randomly.

The random selection signal generator in each of the address swapping circuits 540a~540k is triggered by the power-up signal PUP or the reset signal RST and may generate the random selection signals RSS with different logic levels, and the address swapper in each of the address swapping circuits 540a~540k may convert the row address ROW_ADDR to different swapped row address S_ROW_ADDR designating a different memory cell row in response to the random selection signals RSS with different logic levels.

Figure 15:
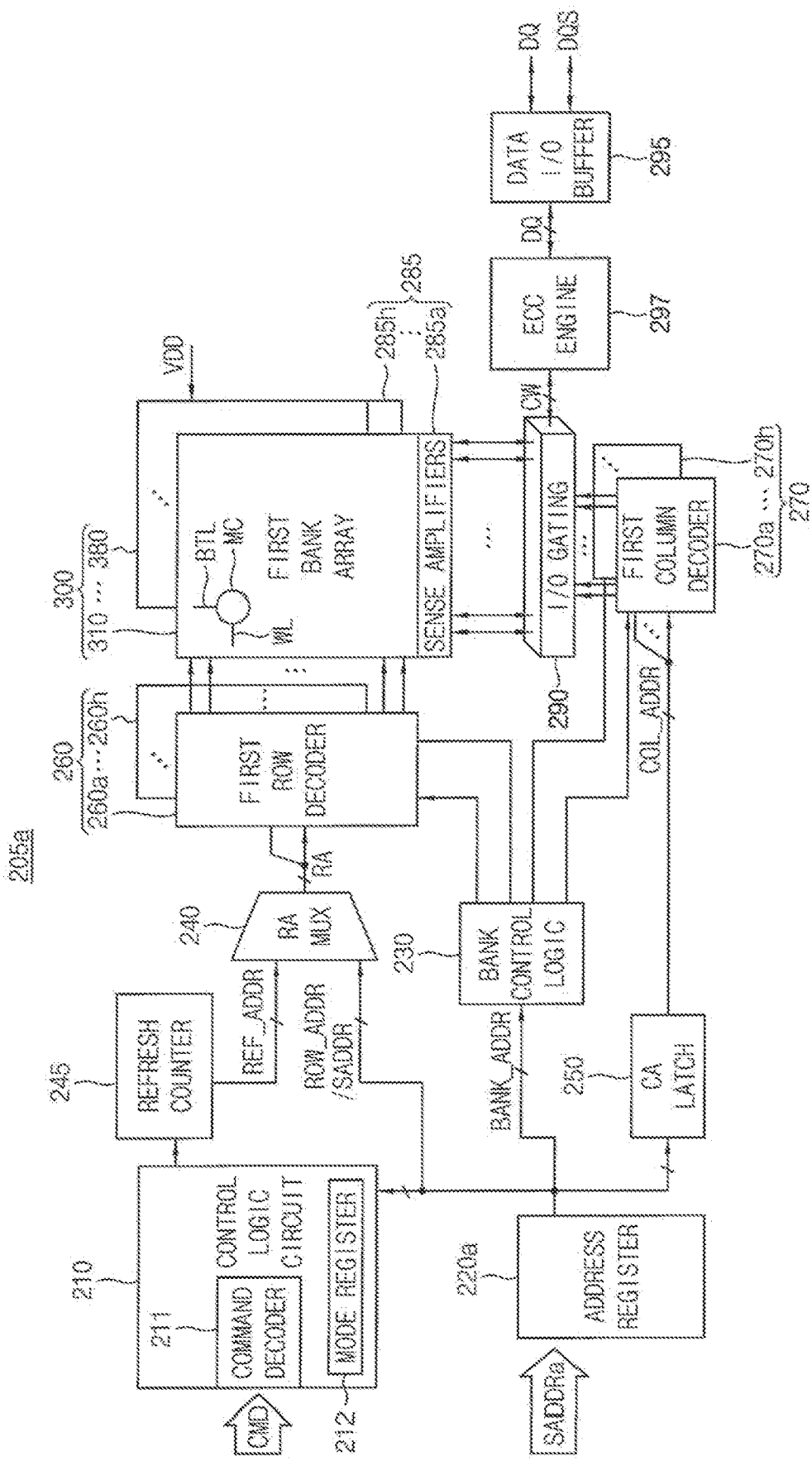
FIG. 15 is a block diagram illustrating one of semiconductor memory devices in the memory module of FIG. 11 according to various exemplary embodiments.

FIG. 15 is a block diagram illustrating one of the semiconductor memory devices in the memory module of FIG. 11 according to various exemplary embodiments.

Referring to FIG. 15, the semiconductor memory device 205a may include a control logic circuit 210, an address register 220a, a bank control logic 230, a row address multiplexer (RA MUX) 240, a column address (CA) latch 250, a row decoder 260, a column decoder 270, a memory cell array 300, a sense amplifier unit 285, an input/output gating circuit (I/O GATING) 290, a data input/output (I/O) buffer 295, a refresh counter 245 and an ECC engine 297.

The semiconductor memory device 205a differs from the semiconductor memory device 201a in that the semiconductor memory device 205a includes the address register 220a instead of the address register 220 and does not include the power-up signal generator 225.

The address register 220a may receive the swapped address SADDRa including a bank address BANK_ADDR, a swapped row address S_ROW_ADDR, and a column address COL_ADDR from the control device 500b. The address register 220a may provide the received bank address BANK_ADDR to the bank control logic 230, may provide the received swapped row address S_ROW_ADDR to the row address multiplexer 240, and may provide the received column address COL_ADDR to the column address latch 250.

The address register 220a does not perform the address swapping operation.

Figure 16:
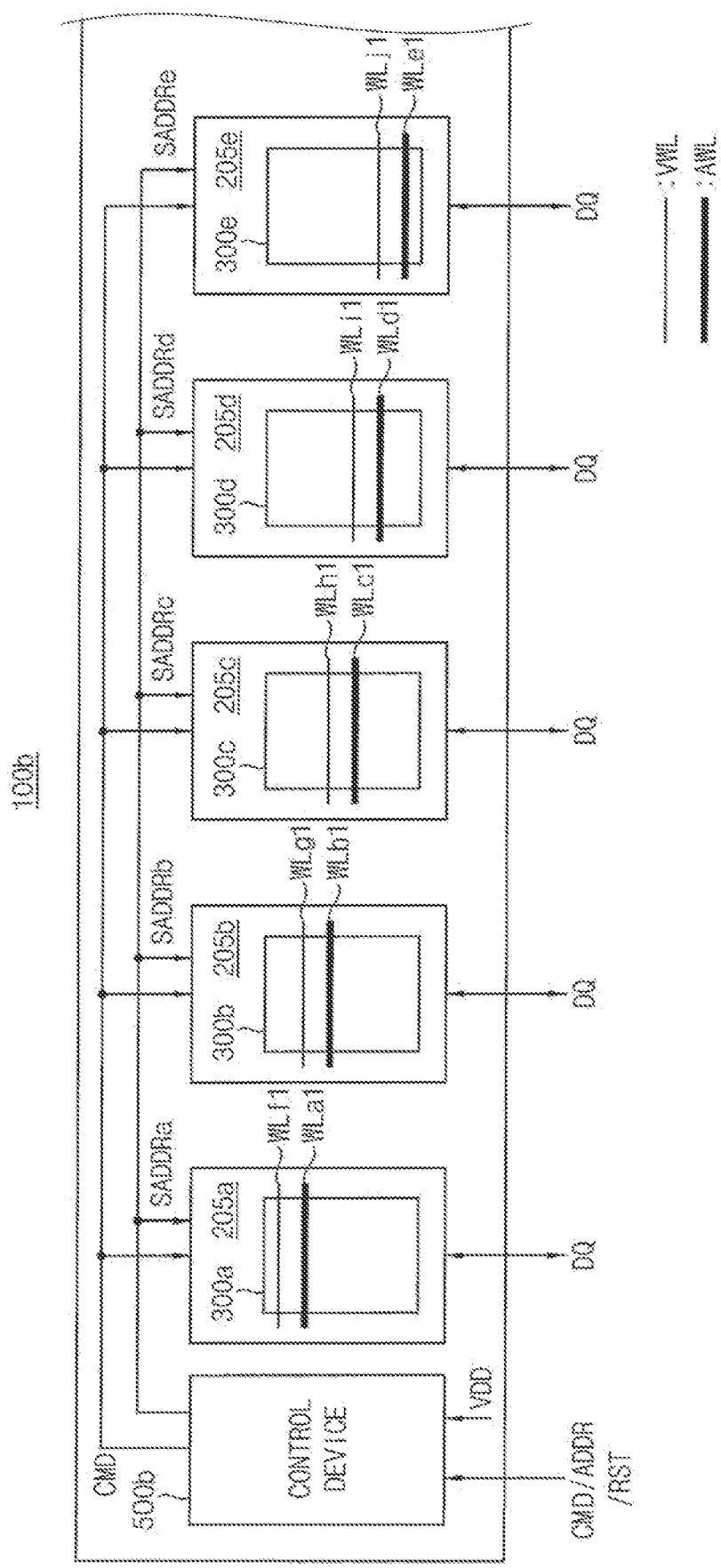
FIG. 16 illustrates an example of an address swapping operation of the memory module of FIG. 11 according to an exemplary embodiment.

FIG. 16 illustrates an example of an address swapping operation of the memory module of FIG. 11 according to an exemplary embodiment.

In FIG. 16, the semiconductor memory devices 205a~205e of the semiconductor memory devices 205a~205e, 206a~206e, 207a~207e, and 208a~208e and the control device 500b are illustrated. It will be understood that the remaining ones of the semiconductor memory devices 205a~205e, 206a~206e, 207a~207e, and 208a~208e operate in a similar manner, and thus description thereof has been omitted for conciseness.

Referring to FIG. 16, the control device 500b receives the command CMD, the access address ADDR and the reset signal RST, receives the power supply voltage VDD from the PMIC 185, relays the command CMD to the semiconductor memory devices 205a~205e and provides the swapped address SADDRa~SADDRe to the semiconductor memory devices 205a~205e, respectively.

The semiconductor memory device 205a includes a memory cell array 300a, the semiconductor memory device 205b includes a memory cell array 300b, the semiconductor memory device 205c includes a memory cell array 300c, the semiconductor memory device 205d includes a memory cell array 300d and the semiconductor memory device 205e includes a memory cell array 300e.

A row decoder of the semiconductor memory device 205a enables a target word-line WLa1 of the memory cell array 300a in response to a first swapping row address of the swapped address SADDRa, and a row decoder of the semiconductor memory device 205b enables a target word-line WLb1 of the memory cell array 300b in response to a second swapping row address of the swapped address SADDRb.

A row decoder of the semiconductor memory device 205c enables a target word-line WLc1 of the memory cell array 300c in response to a third swapping row address of the swapped address SADDRc, a row decoder of the semiconductor memory device 205d enables a target word-line WLd1 of the memory cell array 300d in response to a fourth swapping row address of the swapped address SADDRd and a row decoder of the semiconductor memory device 205e enables a target word-line WLe1 of the memory cell array 300e in response to a fifth swapping row address of the swapped address SADDRe.

Therefore, the semiconductor memory devices 205a~205e enable different target word-lines WLa1, WLb1, WLc1, WLd1 and WLe1, respectively when the memory controller 25 provides the access address ADDR. In addition, if the access address ADDR is intensively accessed, victim word-lines WLf1, WLg1, WLh1, WLi1 and WLj1 disturbed by the target word-lines WLa1, WLb1, WLc1, WLd1 and WLe1, respectively, are different in the semiconductor memory devices 205a~205e. Therefore, the semiconductor memory devices 205a~205e may distribute the victim word-lines WLf, WLg, WLh, WLi and WLj disturbed by the access address ADDR.

In FIG. 16, AWL denotes aggressor word-lines corresponding to the target word-lines WLa1, WLb1, WLc1, WLd1 and WLe1, and VWL denotes the victim word-lines.

Figure 17A:
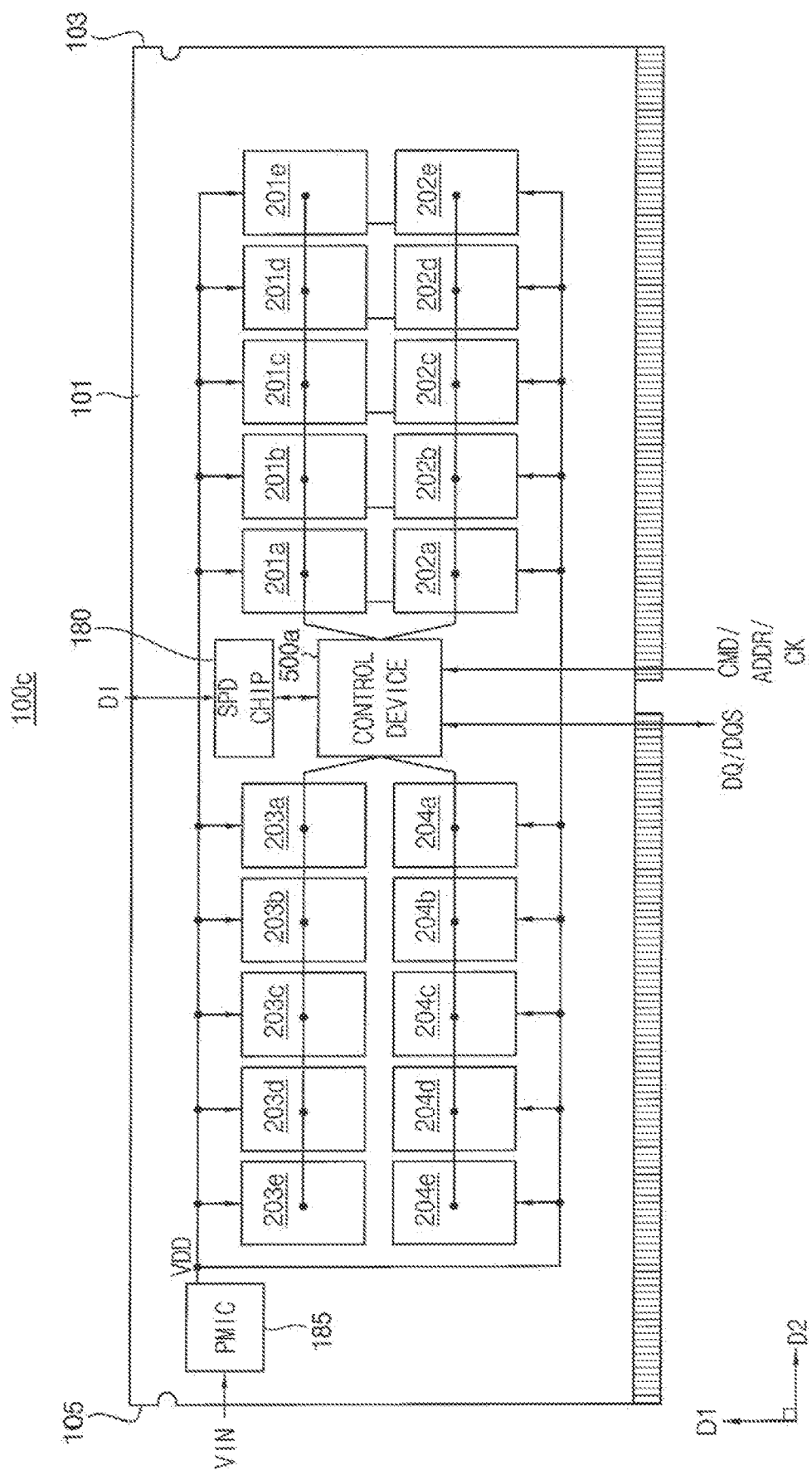
FIG. 17A is a block diagram illustrating another example of a memory module of the memory system of FIG. 1 according to an exemplary embodiment.

FIG. 17A is a block diagram illustrating another example of a memory module of the memory system of FIG. 1 according to an exemplary embodiment.

A memory module 100c of FIG. 17A differs from the memory module 100a of FIG. 2 in that the memory module 100c does not include data buffers (DB) which receive/transmit the data signal DQ and the data strobe signal DQS from/to the plurality of semiconductor memory devices 201a~201e, 202a~202e, 203a~203e, and 204a~204e. The memory module 100c may receive/transmit the data signal DQ and the data strobe signal DQS from/to the memory controller 25 through the control device 500a.

As described with reference to FIG. 2, each of the semiconductor memory devices 201a~201e, 202a~202e, 203a~203e, and 204a~204e may include an address swapping circuit that performs an address swapping operation to randomly swap a portion of bits of the access address ADDR to generate a swapped address in response to a power-up signal or a reset signal and enables a respective target word-line among from a plurality of word-lines in the memory cell array such that at least two of the semiconductor memory devices 201a~201e, 202a~202e, 203a~203e, and 204a~204e enable different target word-lines in response to the access address.

Figure 17B:
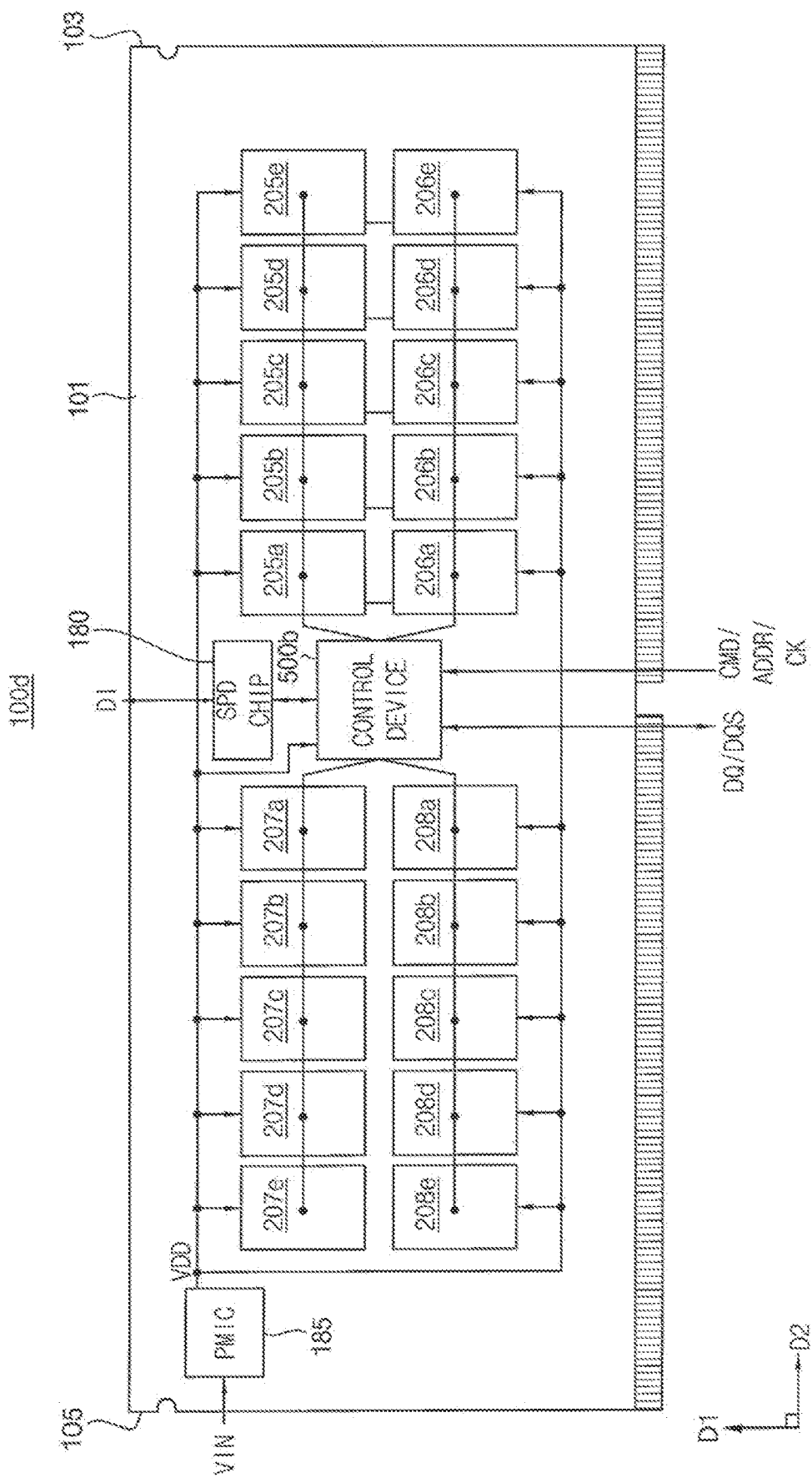
FIG. 17B is a block diagram illustrating another example of a memory module of the memory system of FIG. 1 according to an exemplary embodiment.

FIG. 17B is a block diagram illustrating another example of a memory module of the memory system of FIG. 1 according to an exemplary embodiment.

A memory module 100d of FIG. 17B differs from the memory module 100b of FIG. 11 in that the memory module 100d does not include data buffers (DB) which receive/transmit the data signal DQ and the data strobe signal DQS from/to the plurality of semiconductor memory devices 205a~205e, 206a~206e, 207a~207e, and 208a~208e. The memory module 100d may receive/transmit the data signal DQ and the data strobe signal DQS from/to the memory controller 25 through the control device 500b. The control device 500b receives the reset signal RST from the memory controller 25 and receives the power supply voltage VDD from the PMIC 185.

As described with reference to FIG. 11, the control device 500b receives the command CMD, the access address ADDR, the clock signal CK and the reset signal RST, randomly swaps a portion of bits of the access address ADDR to generate swapped addresses in response to the reset signal RST or a power-up signal to provide the swapped addresses to the semiconductor memory devices 205a~205e, 206a~206e, 207a~207e, and 208a~208e, respectively in the memory module 100d in FIG. 17B. The control device 500b may include a plurality of address swapping circuits corresponding to respective one of the semiconductor memory devices 205a~205e, 206a~206e, 207a~207e, and 208a~208e.

Each of the semiconductor memory devices 205a~205e, 206a~206e, 207a~207e, and 208a~208e receives a corresponding one of the swapped addresses and enables a target word-line corresponding to the respective one of the swapped addresses such that two or more of the semiconductor memory devices 205a~205e, 206a~206e, 207a~207e, and 208a~208e enable different target word-lines with respect to the access address ADDR.

Figure 18:
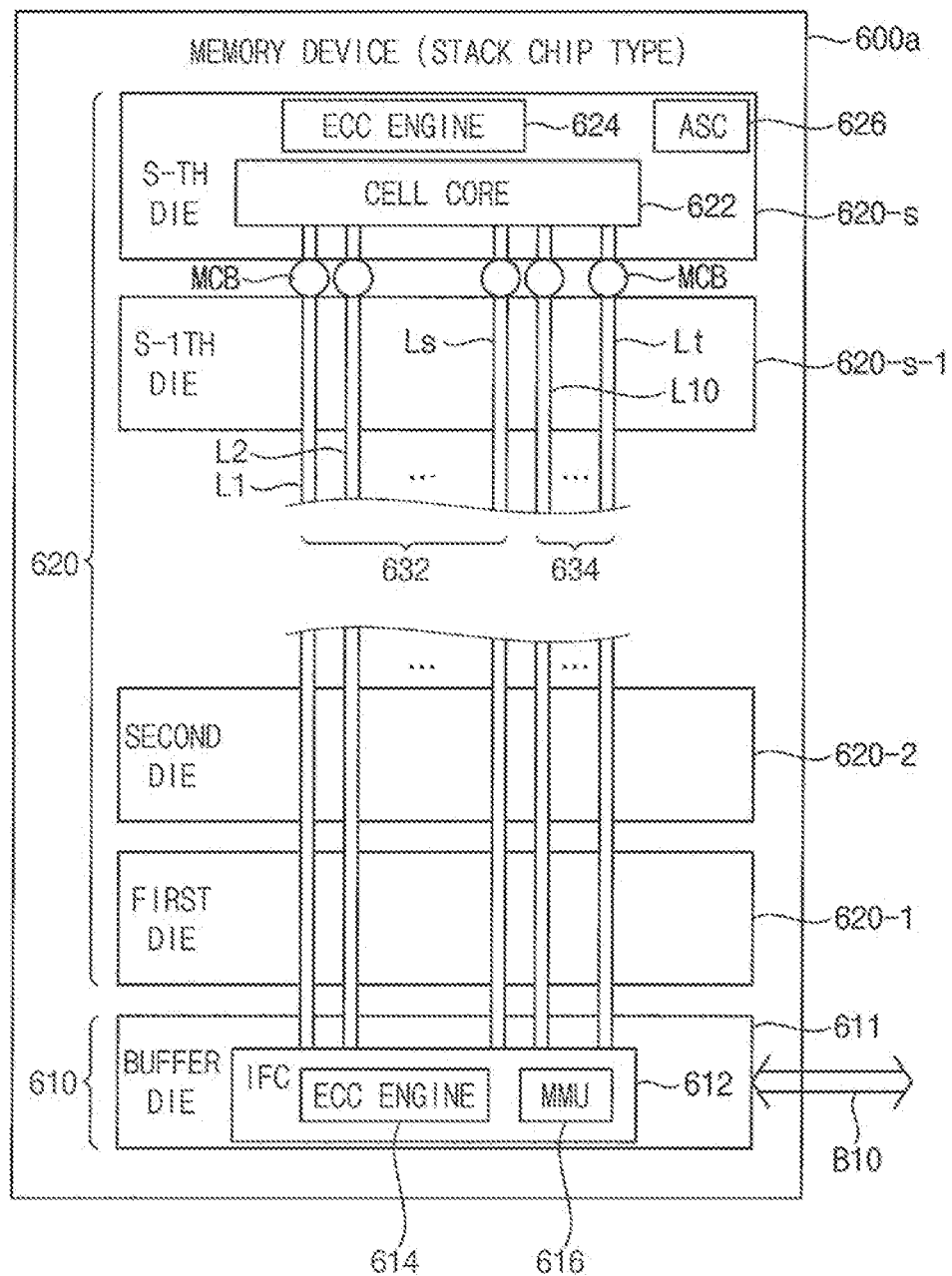
FIG. 18 is a block diagram illustrating an example of a stacked memory device according to an exemplary embodiment.

FIG. 18 is a block diagram illustrating an example of a stacked memory device according to an exemplary embodiment.

Referring to FIG. 18, a semiconductor memory device 600a may include a first group of dies 610 and a second group of dies 620 providing a stacked chip structure.

The first group of dies 610 may include at least one buffer die 611. The second group of dies 620 may include a plurality of memory dies 620-1 to 620-s which is stacked on the at least one buffer die 611 and conveys data through a plurality of through substrate via (or, through silicon via (TSV)) lines. Here, s is an integer greater than two.

Each of the memory dies 620-1 to 620-s may include a cell core 622 including a memory cell array to store data, an ECC engine 624, and an address swapping circuit (ASC) 626. The address swapping circuit 626 may employ the address swapping circuit 400 of FIG. 5. Therefore, the address swapping circuit 626 may randomly swap a portion of bits of a row address ROW_ADDR to generate a swapped row address, and may provide the swapped row address to a row decoder in the cell core. Therefore, row decoders in the memory dies 620-1 to 620-s may enable different target word-lines with respect to the same access address from the memory controller.

Each of the memory dies 620-1 to 620-s may employ a similar configuration with the semiconductor memory device 201a of FIG. 3.

The buffer die 611 may include an interface circuit IFC 612 including an ECC engine 614 and an MMU 616.

The ECC engine 614 may be referred to as a via ECC engine and may correct a transmission error in transmissions provided from at least one of the memory dies 620-1 to 620-s.

A data TSV line group 632 which is formed at one memory die 620-s may include a plurality of TSV lines L1 to Ls, and a parity TSV line group 634 may include a plurality of TSV lines L10 to Lt. The TSV lines L1 to Ls of the data TSV line group 632 and the parity TSV lines L10 to Lt of the parity TSV line group 634 may be connected to micro bumps MCB which are correspondingly formed among the memory dies 620-1 to 620-s.

The stacked memory device 600a may have a three-dimensional (3D) chip structure or a 2.5D chip structure to communicate with the host through a data bus B10. The buffer die 611 may be connected with the memory controller through the data bus B10.

Figure 19:
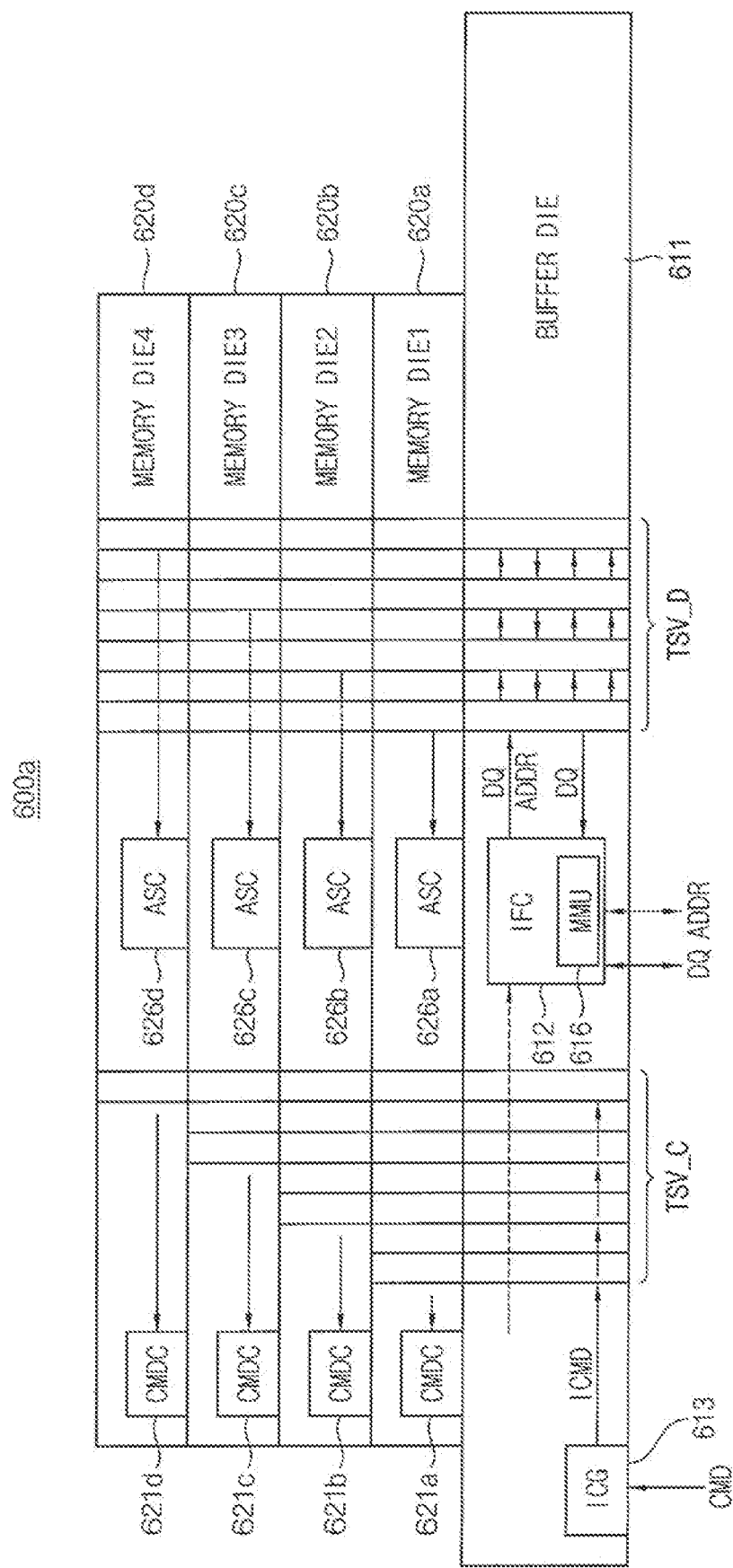
FIG. 19 illustrates an example of the stacked memory device of FIG. 18 according to an exemplary embodiment.

FIG. 19 illustrates an example of the stacked memory device of FIG. 18 according to an exemplary embodiment.

Referring to FIG. 19, the stacked memory device 600a may include the buffer die 611 and a plurality memory dies 620a, 620b, 620c and 620d corresponding to the memory dies 620-1 to 620-s.

Referring to FIG. 19, the buffer die 611 includes an internal command generator ICG 613 and the interface circuit IFC 612. The interface circuit IFC 611 includes the MMU 616. Internal commands ICMD from the internal command generator 613 are provided to the memory dies 620a, 620b, 620c and 620d through command through silicon vias TSV_C which are independently formed for each channel.

The interface circuit 612 may provide the data DQ and the access address ADDR to a corresponding memory die through data through silicon vias TSV D which are commonly formed for the memory dies 620a, 620b, 620c and 620d in a write operation and may provide the data from the corresponding memory die to an outside.

The memory dies 620a, 620b, 620c and 620d may respectively include command decoders 621a to 621d which output internal control signals by decoding internal commands, and address swapping circuits 626a to 626d which randomly swap a portion of bits of a row address in the access address to output swapped row addresses. Each of the address swapping circuit 626a to 626d may employ the address swapping circuit 400 of FIG. 4 and may include a random selection signal generator and an address swapper.

The address swapping circuit 626a to 626d may enable different target word-lines designating different memory locations in the memory dies 620a, 620b, 620c and 620d with respect to the same access address ADDR.

Figure 20:
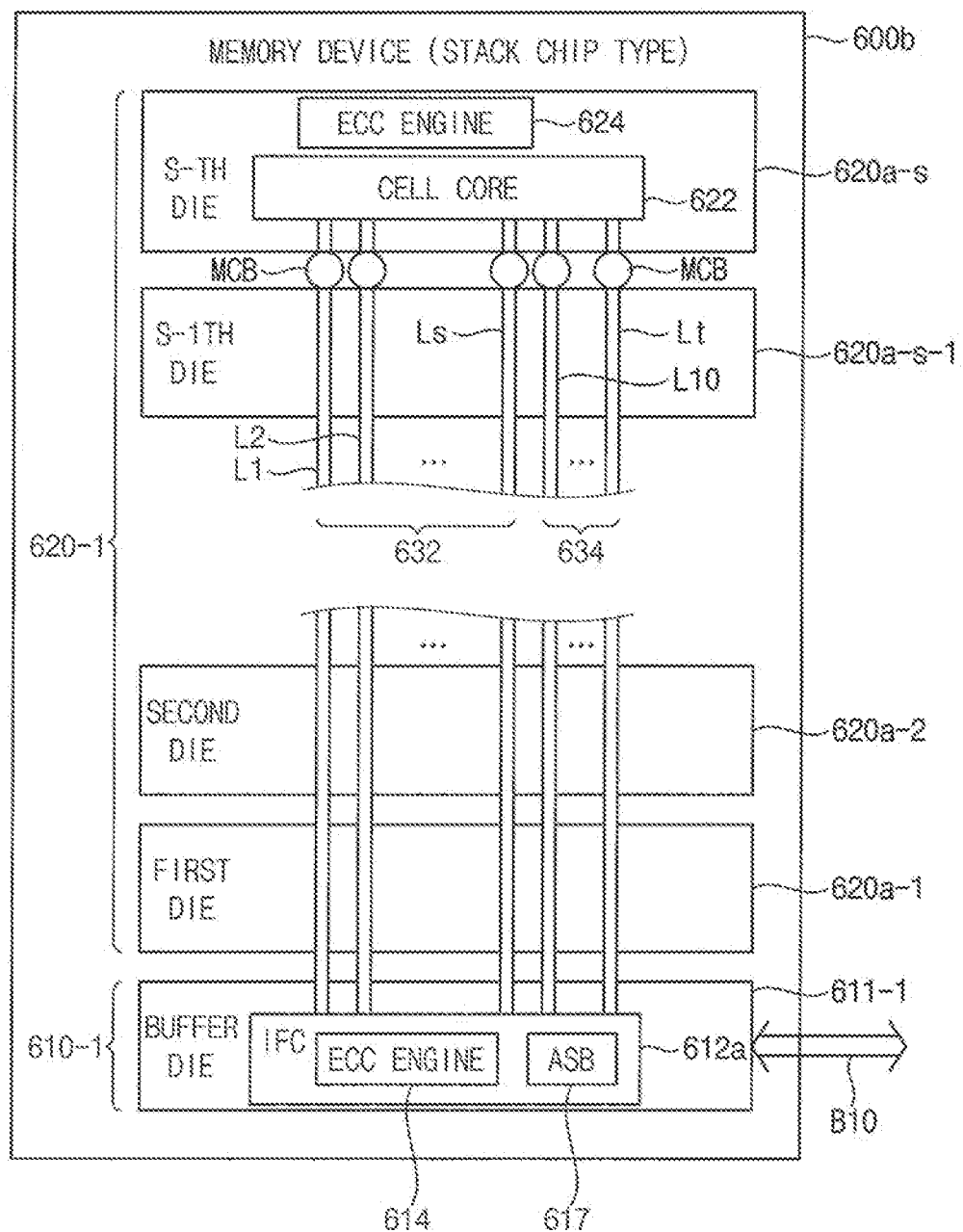
FIG. 20 is a block diagram illustrating another example of a stacked memory device according to an exemplary embodiment.

FIG. 20 is a block diagram illustrating another example of a stacked memory device according to an exemplary embodiment.

Referring to FIG. 20, a semiconductor memory device 600b may include a first group of dies 610-1 and a second group of dies 620-1 providing a stacked chip structure.

The first group of dies 610-1 may include at least one buffer die 611-1. The second group of dies 620-1 may include a plurality of memory dies 620a-1 to 620a-s which are stacked on the at least one buffer die 611-1 and convey data through a plurality of through substrate via (or, through silicon via (TSV)) lines. Here, s is an integer greater than two.

Each of the memory dies 620a-1 to 620a-s may include a cell core 622 including a memory cell array to store data and an ECC engine 624.

Each of the memory dies 620a-1 to 620a-s may employ a similar configuration with the semiconductor memory device 205a of FIG. 15.

The buffer die 611-1 may include an interface circuit IFC 612a including an ECC engine 614 and an ASB 617.

The ASB 617 may employ the ASB 520 of FIG. 13. Therefore, the ASB 617 may include includes a power-up signal generator and a plurality of address swapping circuits.

A number of the address swapping circuits may be equal to or less than a number of the memory dies 620a-1 to 620a-s.

The power-up signal generator generates a power-up signal which is enabled in response to the power supply voltage being equal to or greater than a reference voltage. The power-up signal generator provides the power-up signal to the address swapping circuits. The address swapping circuits may randomly swap a portion of bits of the access address ADDR to generate the swapped addresses in response to the power-up signal or the reset signal RST and may provide the swapped addresses to the memory dies 620a-1 to 620a-s, respectively.

An address register in each of the memory dies 620a-1 to 620a-s receives a corresponding swapped address of the swapped address and provides the swapped address to a row decoder. The row decoder may enable a target word-line, designated by the swapped address, in the memory cell array.

The memory dies 620a-1 to 620a-s may enable different target word-lines designating different memory locations in the memory dies memory dies 620a-1 to 620a-s with respect to the same access address ADDR.

The ECC engine 614 may be referred to as a via ECC engine and may correct transmission errors in transmissions provided from at least one of the memory dies 620*a*-1 to 620*a*-*s*.

A data TSV line group 632 which is formed at one memory die 620*a*-*s* may include a plurality of TSV lines L1 to Ls, and a parity TSV line group 634 may include a plurality of TSV lines L10 to Lt. The TSV lines L1 to Ls of the data TSV line group 632 and the parity TSV lines L10 to Lt of the parity TSV line group 634 may be connected to micro bumps MCB which are correspondingly formed among the memory dies 620*a*-1 to 620*a*-*s*.

The stacked memory device 600*b* may have a three-dimensional (3D) chip structure or a 2.5D chip structure to communicate with the host through a data bus B10. The buffer die 611-1 may be connected with the memory controller through the data bus B10.

Figure 21:
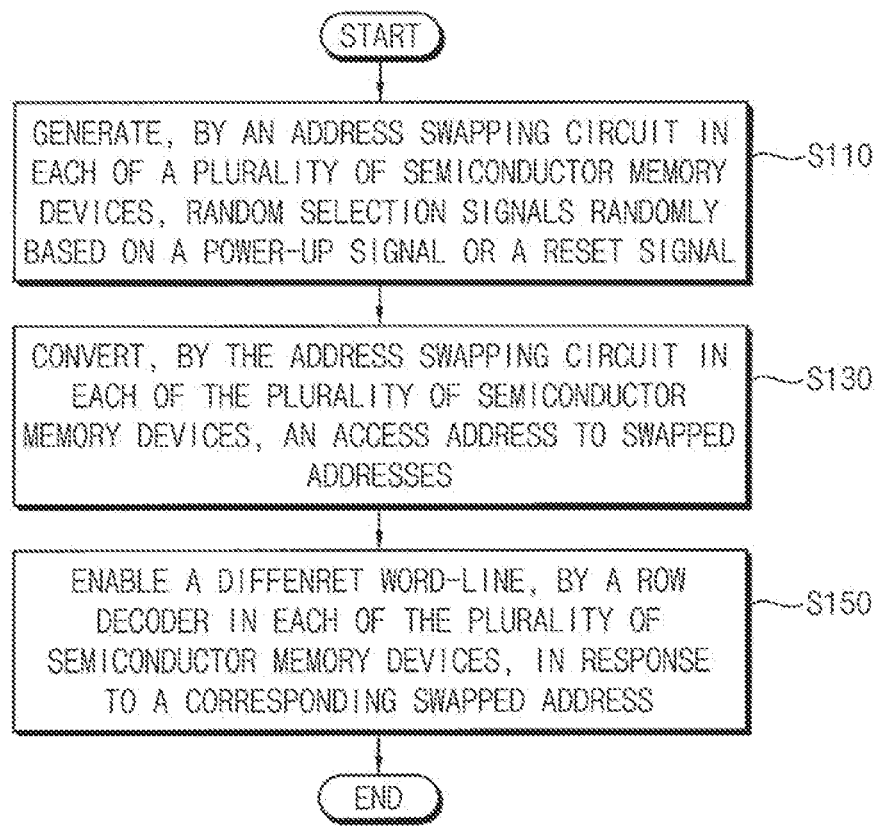
FIG. 21 is a flow chart illustrating a method of operating a memory module according to an exemplary embodiment.

FIG. 21 is a flow chart illustrating a method of operating a memory module according to an exemplary embodiment.

Referring to FIGS. 1 through 17B and 21, there is provided a method of operating a memory module 500*a* which includes a control device 500*a* mounted on a circuit board and a plurality of semiconductor memory devices 201*a*~201*e*, 202*a*~202*e*, 203*a*~203*e*, and 204*a*~204*e*.

According to the method, an address swapping circuit 400 in each of the semiconductor memory devices 201*a*~201*e*, 202*a*~202*e*, 203*a*~203*e*, and 204*a*~204*e* may randomly generate random selection signals RSS based on a power-up signal PUP or a reset signal RST from the control device 500*a* (S110). The address swapping circuit 400 in each of the semiconductor memory devices 201*a*~201*e*, 202*a*~202*e*, 203*a*~203*e*, and 204*a*~204*e* may generate random selection signals RSS in a different sequence.

The address swapping circuit 400 in each of the semiconductor memory devices 201*a*~201*e*, 202*a*~202*e*, 203*a*~203*e*, and 204*a*~204*e* may convert an access address to swapped addresses (S130). For example, the address swapping circuit 400 in each of the semiconductor memory devices 201*a*~201*e*, 202*a*~202*e*, 203*a*~203*e*, and 204*a*~204*e* may swap a portion of bits of the row address ROW_ADDR to generate a swapped row address S_ROW_ADDR in response to the random selection signals RSS (S130).

A row decoder 260 in each of the semiconductor memory devices 201*a*~201*e*, 202*a*~202*e*, 203*a*~203*e*, and 204*a*~204*e* may enable a different word-line in response to a corresponding swapped address (S150). For example, the row decoder 260 in each of the semiconductor memory devices 201*a*~201*e*, 202*a*~202*e*, 203*a*~203*e*, and 204*a*~204*e* may enable a target word-line in response to the swapped row address S_ROW_ADDR such that at least two or more of the semiconductor memory devices 201*a*~201*e*, 202*a*~202*e*, 203*a*~203*e*, and 204*a*~204*e* enable different target word-lines.

Therefore, according to the method, if the access address ADDR is intensively accessed, the semiconductor memory devices 201*a*~201*e* may distribute the victim word-lines disturbed by the access address ADDR.

Figure 22:
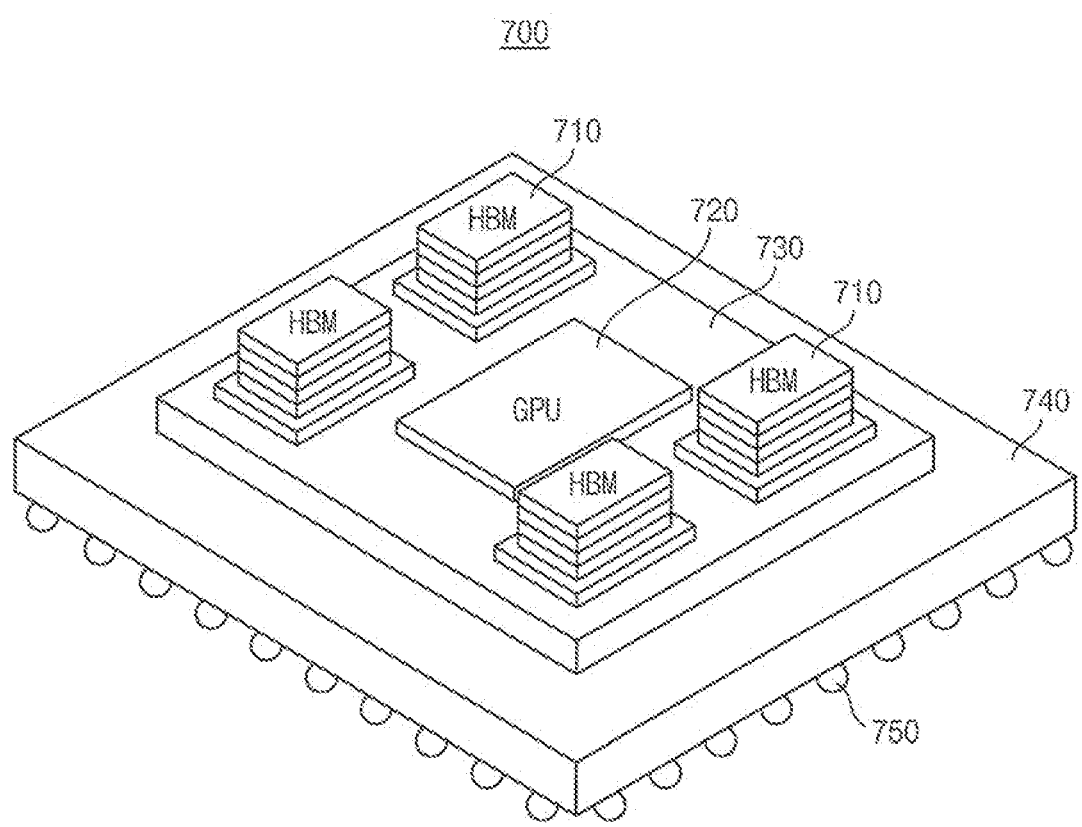
FIG. 22 is a diagram illustrating a semiconductor package including a stacked memory device according to an exemplary embodiment.

FIG. 22 is a diagram illustrating a semiconductor package including the stacked memory device according to an exemplary embodiment.

Referring to FIG. 22, a semiconductor package 700 may include one or more stacked memory devices 710 and a graphics processing unit (GPU) 720.

The stacked memory devices 710 and the GPU 720 may be mounted on an interposer 730, and the interposer on which the stacked memory device 710 and the GPU 720 are mounted may be mounted on a package substrate 740. The package substrate 740 is mounted on solder balls 750. The GPU 720 may perform a same operation as the memory controller 25 in FIG. 1 or may include the memory controller 25. The GPU 720 may store data, which is generated or used in graphic processing, in the stacked memory devices 710.

The stacked memory device 710 may be implemented in various forms, and the stacked memory device 710 may be a memory device in an high bandwidth memory (HBM) form in which a plurality of layers are stacked. In some exemplary embodiments, the stacked memory device 710 may employ the stacked memory device according to FIG. 18 or FIG. 20. Accordingly, the stacked memory device 710 may include a buffer die and a plurality of memory dies. The buffer die may include an interface circuit.

Each of the memory dies may include a cell core including memory cell array, an ECC engine and an address swapping circuit.

The address swapping circuit may employ the address swapping circuit 400 of FIG. 5. Therefore, the address swapping circuit may randomly swap a portion of bits of a row address to generate a swapped row address, and may provide the swapped row address to a row decoder in the cell core. Therefore, row decoders in the memory dies may enable different target word-lines with respect to the same access address from the memory controller.

The buffer die may include an ASB. The ASB may employ the ASB of FIG. 13. Therefore, the ASB 617 may include includes a power-up signal generator and a plurality of address swapping circuits. The address swapping circuits may randomly swap a portion of bits of the access address to generate the swapped addresses in response to the power-up signal or the reset signal and may provide the swapped addresses to the memory dies, respectively.

The plurality of stacked memory devices 710 may be mounted on the interposer 730, and the GPU 720 may communicate with the plurality of stacked memory devices 710. For example, each of the stacked memory devices 710 and the GPU 720 may include a physical region, and communication may be performed between the stacked memory devices 710 and the GPU 720 through the physical regions.

Figure 23:
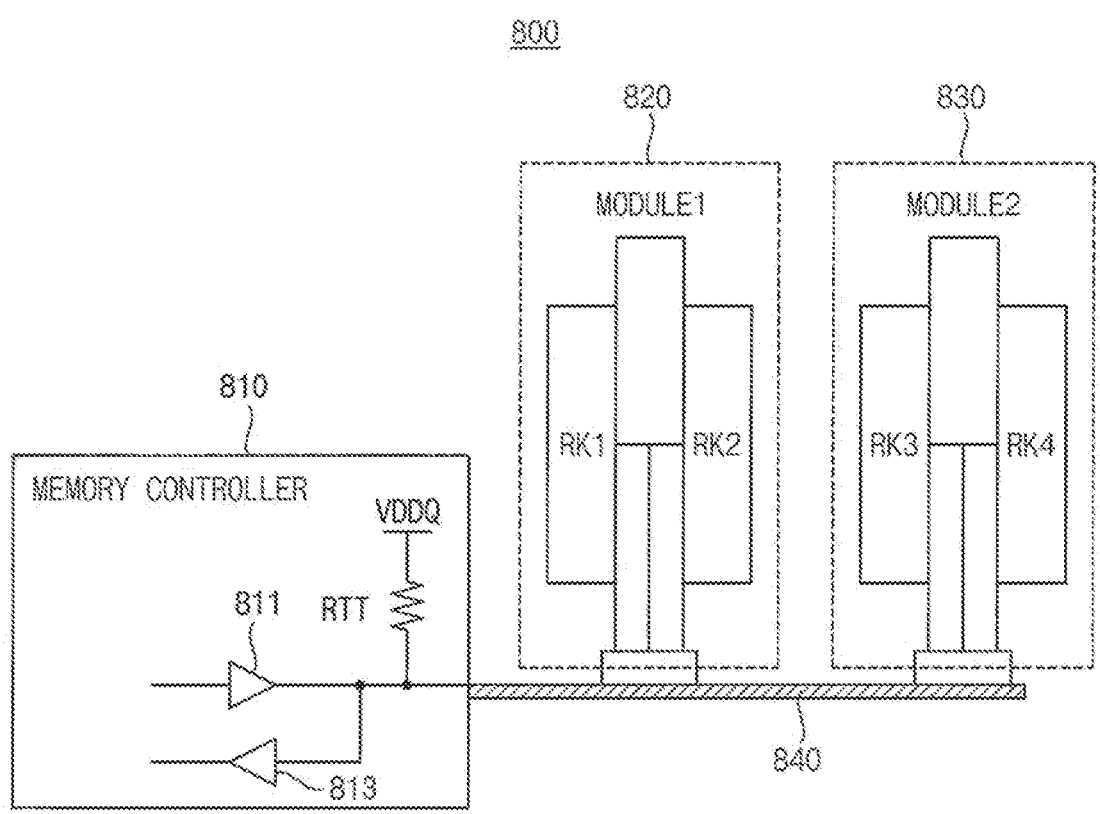
FIG. 23 is a block diagram illustrating a memory system having quad-rank memory modules according to an exemplary embodiment.

FIG. 23 is a block diagram illustrating a memory system having quad-rank memory modules according to an exemplary embodiment.

Referring to FIG. 23, a memory system 800 may include a memory controller 810 and one or more memory modules 820 and 830. Two memory modules 820 and 830 are illustrated in FIG. 23, but this is only an example.

The memory controller 810 may control the one or more memory modules 820 and 830 so as to perform a command supplied from a processor or host. The memory controller 810 may be implemented in a processor or host, or may be implemented with an application processor or a system-on-a-chip (SoC). For signal integrity, a source termination may be implemented with a resistor RTT on a bus 840 of the memory controller 810. The resistor RTT may be coupled to a power supply voltage VDDQ. The memory controller 810 may include a transmitter 811 to transmit a signal to the one or more memory modules 820 and 830 and a receiver 813 to receive a signal from the one or more memory modules 820 and 830.

The one or more memory modules 820 and 830 may be referred to as a first memory module 820 and a second memory module 830. The first memory module 820 and the second memory module 830 may be coupled to the memory controller 810 through the bus 840. Each of the first memory module 820 and the second memory modules 830 may correspond to the memory module 100 of FIG. 2 or the memory module 100a of FIG. 18. The first memory module 820 may include one or more memory ranks RK1 and RK2, and the second memory module 830 may include one or more memory ranks RK3 and RK4.

Each of the first memory module 820 and the second memory module 830 may include a control device disposed on a center of a circuit board, a first group of semiconductor memory devices disposed between the control device and a first edge portion of the circuit board and a second group of semiconductor memory devices disposed between the control device and a second edge portion of the circuit board.

In an exemplary embodiment, each of the semiconductor memory devices may include an address swapping circuit and the address swapping circuit swaps a portion of bits of a row address to generate a swapped row address and applies the swapped row address to a row decoder. In an exemplary embodiment, the control device may include a plurality of address swapping circuits corresponding to the semiconductor memory devices, the address swapping circuits swap a portion of bits of the row address to generate swapped row addresses and applies the swapped row addresses to the semiconductor memory devices. A row decoder in each of the semiconductor memory devices may enable different target word-line in response to corresponding one of the swapped row addresses.

The semiconductor memory devices in the first memory module 820 and the second memory module 830 may enable different target word-lines with respect to the same access address to distribute the victim word-lines disturbed by the access address.

Figure 24:
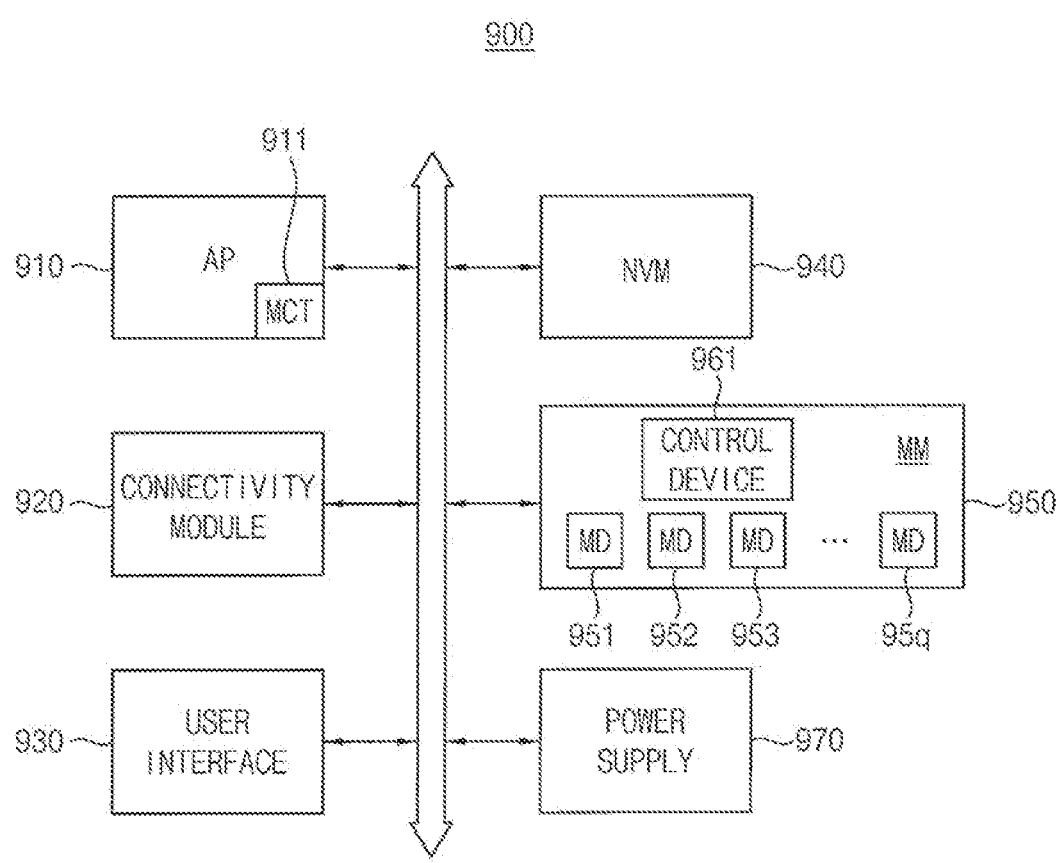
FIG. 24 is a block diagram illustrating a mobile system including a memory module according to an exemplary embodiment.

FIG. 24 is a block diagram illustrating a mobile system including a memory module according to an exemplary embodiment.

Referring to FIG. 24, a mobile system 900 may include an application processor (AP) 910, a connectivity module 920, a memory module (MM) 950, a nonvolatile memory device (NVM) 940, a user interface 930, and a power supply 970. The application processor 910 may include a memory controller (MCT) 911.

The application processor 910 may execute applications, such as a web browser, a game application, a video player, etc. The connectivity module 920 may perform wired or wireless communication with an external device.

The memory module 950 may store data processed by the application processor 910 or operate as a working memory. The memory module 950 may include a plurality of semiconductor memory devices (MD) 951~95q (where q is a natural number greater than three), and a control device 961. Each of the semiconductor memory devices 951~95q may include an address swapping circuit and the address swapping circuit may swap a portion of bits of a row address to generate a swapped row address and apply the swapped row address to a row decoder. In some exemplary embodiments, the control device 961 may include a plurality of address swapping circuits corresponding to the semiconductor memory devices 951~95q, the address swapping circuits may swap a portion of bits of the row address to generate swapped row addresses and apply the swapped row addresses to the semiconductor memory devices 951~95q. A row decoder in each of the semiconductor memory devices 951~95q may enable different target word-line in response to corresponding one of the swapped row addresses.

Therefore, the semiconductor memory devices 951~95q may enable different target word-lines with respect to the same access address to distribute the victim word-lines disturbed by the access address when the access address is intensively accessed.

The nonvolatile memory device 940 may store a boot image for booting the mobile system 900. The user interface 930 may include at least one input device, such as a keypad, a touch screen, etc., and at least one output device, such as a speaker, a display device, etc. The power supply 970 may supply an operating voltage to the mobile system 900.

In various exemplary embodiments, the mobile system 900 and/or components of the mobile system 900 may be packaged in various forms.

The various exemplary embodiments as described above may be applied to systems using memory modules or stacked memory devices.

While various exemplary embodiments have been shown and described above, it will be apparent to those of ordinary skill in the art that modifications and variations in form and details may be made thereto without departing from the spirit and scope of the present disclosure, as set forth by the following claims.

What is claimed is:

1. A memory module comprising:
  a plurality of semiconductor memory devices mounted on a circuit board, each of plurality of semiconductor memory devices including a memory cell array to store data; and
  a control device mounted on the circuit board, and configured to receive a command and an access address from an external device and to provide the command and the access address to the plurality of semiconductor memory devices,
  wherein each of the plurality of semiconductor memory devices is configured to perform an address swapping operation to randomly swap a portion of bits of the access address to generate a swapped address in response to a power-up signal or a reset signal, and to enable a respective target word-line from among a plurality of word-lines in the memory cell array of the semiconductor memory device such that at least two of the plurality of semiconductor memory devices enable different target word-lines in response to the access address.

2. The memory module of claim 1, wherein:
  each of the plurality of semiconductor memory devices includes an address swapping circuit configured to perform the address swapping operation on a row address in the access address.

3. The memory module of claim 2, wherein the address swapping circuit includes:
  a random selection signal generator configured to randomly generate random selection signals in response to the power-up signal or the reset signal; and
  an address swapper configured to swap a portion of bits of the row address to generate the swapped address, and output the swapped address in response to the random selection signals.

4. The memory module of claim 3,
  wherein the random selection signal generator includes a physically unclonable function (PUF) configured to generate the random selection signals in response to the power-up signal or the reset signal.

5. The memory module of claim 3,
  wherein the random selection signal generator includes an anti-fuse circuit in which the random selection signals are randomly programmed, the anti-fuse circuit configured to output the random selection signals in response to the power-up signal or the reset signal, and wherein the random selection signals are programmed in the anti-fuse circuits in the plurality of semiconductor memory devices in different sequences.

6. The memory module of claim 3, wherein the address swapper includes a plurality of multiplexers configured to select different bits of the portion of bits of the row address to generate the swapped address, and to output the swapped address in response to combination of the random selection signals.

7. The memory module of claim 1, wherein each of the plurality of semiconductor memory devices further includes:

a row decoder, coupled to the memory cell array through the plurality of word-lines, the row decoder configured to receive the swapped address; and a power-up signal generator configured to generate the power-up signal in response to a power supply voltage being equal to or greater than a reference voltage.

8. The memory module of claim 7, wherein each of the plurality of semiconductor memory devices further includes:

an address register configured to receive the access address and the power-up signal, and the address register includes an address swapping circuit that performs the address swapping operation.

9. The memory module of claim 7, wherein the row decoder is configured to enable one of the plurality of word-lines as the target word-line, in response to the swapped address.

10. The memory module of claim 1, wherein the plurality of semiconductor memory devices are configured to distribute victim word-lines disturbed by the access address in response to the access address being accessed more frequently than a reference number of access times.

11. A memory module comprising:

a plurality of semiconductor memory devices mounted on a circuit board, each of plurality of semiconductor memory devices including a memory cell array to store data; and a control device mounted on the circuit board, and configured to receive a command and an access address from an external device, perform an address swapping operation to randomly swap a portion of bits of the access address to generate swapped addresses in response to a power-up signal or a reset signal and provide the command and the swapped addresses to the plurality of semiconductor memory devices, wherein the plurality of semiconductor memory devices are configured to enable respective target word-lines among from a plurality of word-lines in the memory cell arrays such that at least two of the plurality of semiconductor memory devices enable different target word-lines with respect to the access address.

12. The memory module of claim 11, wherein the control device includes:

a power-up signal generator configured to generate the power-up signal in response to a power supply voltage provided to the control device being equal to or greater than a reference voltage; and a plurality of address swapping circuits corresponding respectively to the plurality of semiconductor memory devices, the plurality of address swapping circuits configured to receive the power-up signal and perform the address swapping operation on a row address in the access address.

13. The memory module of claim 12, wherein each of the plurality of address swapping circuits includes:

a random selection signal generator configured to randomly generate random selection signals in response to the power-up signal or the reset signal; and an address swapper configured to swap a portion of bits of the row address to generate a swapped address and output the swapped address in response to the random selection signals.

14. The memory module of claim 13, wherein the random selection signal generator includes a physically unclonable function (PUF) configured to generate the random selection signals in response to the power-up signal or the reset signal.

15. The memory module of claim 13, wherein the random selection signal generator includes an anti-fuse circuit in which the random selection signals are randomly programmed, the anti-fuse circuit configured to output the random selection signals in response to the power-up signal or the reset signal, and wherein the random selection signals are programmed in the anti-fuse circuits.

16. The memory module of claim 13, wherein the address swapper includes a plurality of multiplexers configured to select different bits of the portion of bits of the row address to generate the swapped address and output the swapped address in response to combination of the random selection signals.

17. The memory module of claim 13, wherein, each of the plurality of semiconductor memory devices further includes a row decoder, coupled to the memory cell array through the plurality of word-lines, the row decoder configured to receive the swapped address, and the row decoder is configured to enable one of the plurality of word-lines as the target word-line, in response to the swapped address.

18. A stacked memory device comprising:

a buffer die configured to receive a command and an access address from an external device, a plurality of memory dies stacked on the buffer die, each of the plurality of memory dies including a memory cell array to store data; and a plurality of through silicon vias (TSVs) extending through the plurality of memory dies to connect to the buffer die, wherein each of the plurality of memory dies is configured to receive the access address through the TSVs, perform an address swapping operation to randomly swap a portion of bits of the access address to generate a swapped address in response to a power-up signal or a reset signal, and enable a respective target word-line from among a plurality of word-lines in the memory cell arrays such that at least two of the plurality of memory dies enable different target word-lines in response to the access address.

19. The stacked memory device of claim 18, wherein each of the plurality of memory dies includes:

an address swapping circuit configured to perform the address swapping operation on a row address in the access address to generate the swapped address;

a row decoder, coupled to the memory cell array through the plurality of word-lines, the row decoder configured to receive the swapped address; and a power-up signal generator configured to generate the power-up signal in response to a power supply voltage being equal to or greater than a reference voltage.

20. The stacked memory device of claim 19, wherein the address swapping circuit includes:

a random selection signal generator configured to randomly generate random selection signals in response to the power-up signal or the reset signal; and an address swapper configured to swap a portion of bits of the row address to generate the swapped address and output the swapped address in response to the random selection signals.

* * * * *